United States Patent
DeBenedictis

(10) Patent No.: US 10,936,230 B2
(45) Date of Patent: Mar. 2, 2021

(54) COMPUTATIONAL PROCESSOR-IN-MEMORY WITH ENHANCED STRIDED MEMORY ACCESS

(71) Applicant: National Technology & Engineering Solutions Of Sandia, LLC, Albuquerque, NM (US)

(72) Inventor: Erik DeBenedictis, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 244 days.

(21) Appl. No.: 15/881,502

(22) Filed: Jan. 26, 2018

(65) Prior Publication Data
US 2019/0235780 A1    Aug. 1, 2019

(51) Int. Cl.
G06F 3/06     (2006.01)
G06F 7/575    (2006.01)

(52) U.S. Cl.
CPC .......... *G06F 3/0644* (2013.01); *G06F 3/0604* (2013.01); *G06F 3/0656* (2013.01); *G06F 3/0673* (2013.01); *G06F 7/575* (2013.01)

(58) Field of Classification Search
CPC .............. G06F 7/575; G06F 7/02; G06F 7/06
See application file for complete search history.

(56) References Cited

U.S. PATENT DOCUMENTS

| | | | |
|---|---|---|---|
| 2016/0330301 A1* | 11/2016 | Raindel | H04L 67/327 |
| 2017/0168827 A1* | 6/2017 | Mishra | G06F 9/30021 |
| 2017/0235511 A1* | 8/2017 | Palmer | G06F 3/0629 711/154 |
| 2018/0188961 A1* | 7/2018 | Venkatesh | G06F 13/1663 |

* cited by examiner

*Primary Examiner* — Yaima Rigol
*Assistant Examiner* — Alexander J Yoon
(74) *Attorney, Agent, or Firm* — Yee & Associates, P.C.

(57) ABSTRACT

A computational memory for a computer. The memory includes a memory bank having a selected-row buffer and being configured to store records up to a number, K. The memory also includes an accumulator connected to the memory bank, the accumulator configured to store up to K records. The memory also includes an arithmetic and logic unit (ALU) connected to the accumulator and to the selected row buffer of the memory bank, the ALU having an indirect network of 2K ports for reading and writing records in the memory bank and the accumulator, and the ALU further physically configured to operate as a sorting network. The memory also includes a controller connected to the memory bank, the ALU, and the accumulator, the controller being hardware configured to direct operation of the ALU.

20 Claims, 18 Drawing Sheets

| | LEVEL | DESCRIPTION | RANGE OF PROGRAMMABILITY | NOTES |
|---|---|---|---|---|
| 402 | HIGH | MICROPROCESSOR | TURING COMPLETE | NOT PART OF SUPERSTRIDER |
| 404 | MIDDLE | TABULAR CONTROL BLOCK | TREE-BASED SUBROUTINES | HIGHER LEVEL OF SUPERSTRIDER |
| 406 | LOW | INTERNAL SORTING NETWORK WITH ARITHMETIC VIA PARALLEL PREFIX/SUFFIX | LIMITED | LOWER LEVEL OF SUPERSTRIDER |

| 1. INPUT 2 LISTS | | 2. FLIP LOWER LIST | | 3. MERGE | | 4A. PARALLEL PREFIX | | 4b.R ED. | 4C. PARALLEL SUFFIX 0-BASED ADDRESS | | | | 5. UNMERGE | | | 6. RESULTS | |
|---|---|---|---|---|---|---|---|---|---|---|---|---|---|---|---|---|---|
| KEY | VAL. | | | $k_n$ | $v_n$ | $k_n$ | $V_n$ | t | $t_n$ | $D_n$ | $A_R$ | $A_D$ | Addr | KEY | VAL. | KEY | VAL. |
| 1 | 0.2 | 1 | 0.2 | 1 | 0.2 | 1 | 0.2 | 4 | 3 | 1 | 0 | 999 | 0 | 11 | 0.2 | 1 | 0.2 |
| 2 | 0.3 | 2 | 0.3 | 2 | 0.3 | 2 | 0.3 | 4 | 3 | 0 | 999 | 7 | 7 | 999 | 0.3 | 2 | 1.6 |
| 3 | 0.4 | 3 | 0.4 | 2 | 0.7 | 2 | 1 | 4 | 3 | 0 | 999 | 6 | 6 | 999 | 1 | 3 | 0.4 |
| 7 | 0.5 | 7 | 0.5 | 2 | 0.6 | 2 | 1.6 | 4 | 2 | 1 | 1 | 999 | 1 | 2 | 1.6 | 4 | 1.7 |
| 2 | 0.6 | 4 | 0.9 | 3 | 0.4 | 3 | 0.4 | 4 | 1 | 1 | 2 | 999 | 2 | 3 | 0.4 | 7 | 0.5 |
| 2 | 0.7 | 4 | 0.8 | 4 | 0.8 | 4 | 0.8 | 4 | 1 | 0 | 999 | 5 | 5 | 999 | 0.8 | 999 | 0.8 |
| 4 | 0.8 | 2 | 0.7 | 4 | 0.9 | 4 | 1.7 | 4 | 0 | 1 | 3 | 999 | 3 | 4 | 1.7 | 999 | 0.2 |
| 4 | 0.9 | 2 | 0.6 | 7 | 0.5 | 7 | 0.5 | 4 | -1 | 1 | 4 | 999 | 4 | 7 | 0.5 | 999 | 1.6 |

| 1. INPUT 2 LISTS | | 2. FLIP LOWER LIST | | 3. MERGE | | 4A. PARALLEL PREFIX | | 4b.R ED. | 4C. PARALLEL SUFFIX 0-BASED ADDRESS | | | | 5. UNMERGE | | | 6. RESULTS | |
|---|---|---|---|---|---|---|---|---|---|---|---|---|---|---|---|---|---|
| KEY | VAL. | | | $k_n$ | $v_n$ | $k_n$ | $V_n$ | t | $t_n$ | $D_n$ | $A_R$ | $A_D$ | Addr | KEY | VAL. | KEY | VAL. |
| 1 | 0.2 | 1 | 0.2 | 1 | 0.2 | 1 | 0.2 | 3 | 2 | 1 | 0 | 999 | 0 | 1 | 0.2 | 1 | 0.2 |
| 2 | 0.3 | 2 | 0.3 | 2 | 0.3 | 2 | 0.3 | 3 | 2 | 0 | 999 | 7 | 7 | 999 | 0.3 | 2 | 2 |
| 2 | 0.4 | 2 | 0.4 | 2 | 0.4 | 2 | 0.7 | 3 | 2 | 0 | 999 | 6 | 6 | 999 | 0.7 | 4 | 1.7 |
| 7 | 0.5 | 7 | 0.5 | 2 | 0.6 | 2 | 1.3 | 3 | 2 | 0 | 999 | 5 | 5 | 999 | 1.3 | 7 | 0.5 |
| 2 | 0.9 | 4 | 0.9 | 2 | 0.7 | 2 | 2 | 3 | 1 | 1 | 1 | 999 | 1 | 2 | 2 | 999 | 0.8 |
| 2 | 0.8 | 4 | 0.8 | 4 | 0.8 | 4 | 0.8 | 3 | 1 | 0 | 999 | 4 | 4 | 999 | 0.8 | 999 | 0 |
| 4 | 0.7 | 2 | 0.7 | 4 | 0.9 | 4 | 1.7 | 3 | 0 | 1 | 2 | 999 | 2 | 4 | 1.7 | 999 | 0.2 |
| 4 | 0.6 | 2 | 0.6 | 7 | 0.5 | 7 | 0.5 | 3 | -1 | 1 | 3 | 999 | 3 | 7 | 0.5 | 999 | 1.3 |

1300

1302

| ADDR:(SIZE) | THE DRAM ROW NUMBER AND A FIELD FOR THE COMPUTED SIZE OF THE SUBTREE ROOTED AT THIS ROW. THE SIZE IS NOT ACCURATE AT ALL TIMES |
|---|---|
| PIVOT | THE PIVOT VALUE FOR SORTING. ELEMENTS OF THE LEFT (RIGHT) SUBTREE ARE LESS THAN (GREATER THAN OR EQUAL TO) THIS VALUE |
| ADDR(SIZE) | THE DRAM ROW NUMBER OF LEFT SUBTREE AND A FIELD FOR THE SIZE OF THE LEFT SUBTREE. THE SIZE IS NOT ACCURATE AT ALL TIMES |
| ADDR(SIZE) | THE DRAM ROW NUMBER OF THE RIGHT SUBTREE AND A FIELD FOR THE SIZE OF THE RIGHT SUBTREE. THE SIZE IS NOT ACCURATE AT ALL TIMES |

FIG. 13

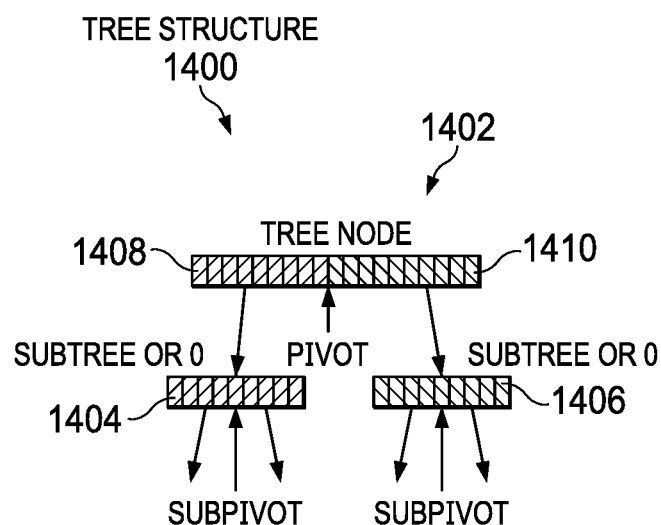

FIG. 14

COMPUTATIONAL PROCESSOR-IN-MEMORY WITH ENHANCED STRIDED MEMORY ACCESS

STATEMENT OF GOVERNMENT INTEREST

This invention was made with Government support under Contract No. DE-NA0003525 awarded by the United States Department of Energy/National Nuclear Security Administration. The United States Government has certain rights in this invention.

BACKGROUND INFORMATION

1. Field

The present disclosure relates to methods and devices for designing and building a computational memory, or processor-in-memory, where the memory alters stored data in useful ways.

2. Background

Faster computer processing is a constant industry demand. Increasing computer processing speed can take the form of enhancing various parts of a computer, including but not limited to the processor, the memory, and the bus of the computer. Thus, one means for increasing computer processing speed is to improve the memory by adding computation power, improving access, or both.

SUMMARY

The illustrative embodiments provide for a computational memory for a computer. The memory includes a memory bank having a selected-row buffer and being configured to store records up to a number, K. The memory also includes an accumulator, the accumulator configured to store up to K records. The memory also includes an arithmetic and logic unit (ALU) connected to the accumulator and to the selected row buffer of the memory bank, the ALU having an indirect network of 2K ports for reading and writing records in the memory bank and the accumulator, and the ALU further physically configured to operate as a sorting network. The memory also includes a controller connected to the memory bank, the ALU, and the accumulator, the controller being hardware configured to direct operation of the ALU.

The illustrative embodiments also provide for a computational memory having an architecture comprising a memory chip configured to translate memory addresses. The memory chip is configured to assist a processor by altering addresses in requests based on application-specific storage patterns. The memory chip is further configured to offload subroutines executed by the processor onto the memory chip using data movement and processing capabilities internal to the memory chip. The memory chip has an arithmetic and logic (ALU) unit that is configured to operate as a sorting network.

The illustrative embodiments also provide for a method of sorting and merging data in a computational memory comprising a memory bank having a selected row buffer and being configured to store records up to a number, K; an accumulator connected to the memory bank, the accumulator configured to store up to K records; an arithmetic and logic unit (ALU) connected to the accumulator and to the selected row buffer of the memory bank, the ALU having an indirect network of 2K ports for reading and writing records in the memory bank and the accumulator, and the ALU further physically configured to operate as a sorting network; and a controller connected to the memory bank, the ALU, and the accumulator, the controller being hardware configured to direct operation of the ALU. The method includes reading, from the memory bank into the selected row buffer, a row of data, thereby creating up to K records in sorted order. The method also includes merging the records with up to K records stored in the accumulator, yielding up to 2K sorted records in the selected row buffer and accumulator. The method also includes determining, by the controller, which records of the up to 2K sorted records will be stored back into the memory bank and which will be left in the accumulator, whereby selected merged records are formed. The method also includes writing the selected merged records back into the memory bank.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 illustrates an example of a sorting computational memory operation on sample data, in accordance with an illustrative embodiment;

FIG. 12 illustrates a continuing example of a sorting computational memory operation on sample data, in accordance with an illustrative embodiment;

FIG. 13 illustrates example control fields for a sorting computational memory, in accordance with an illustrative embodiment;

FIG. 14 illustrates the Superstrider tree structure, in accordance with an illustrative embodiment;

DETAILED DESCRIPTION

Figure 1:
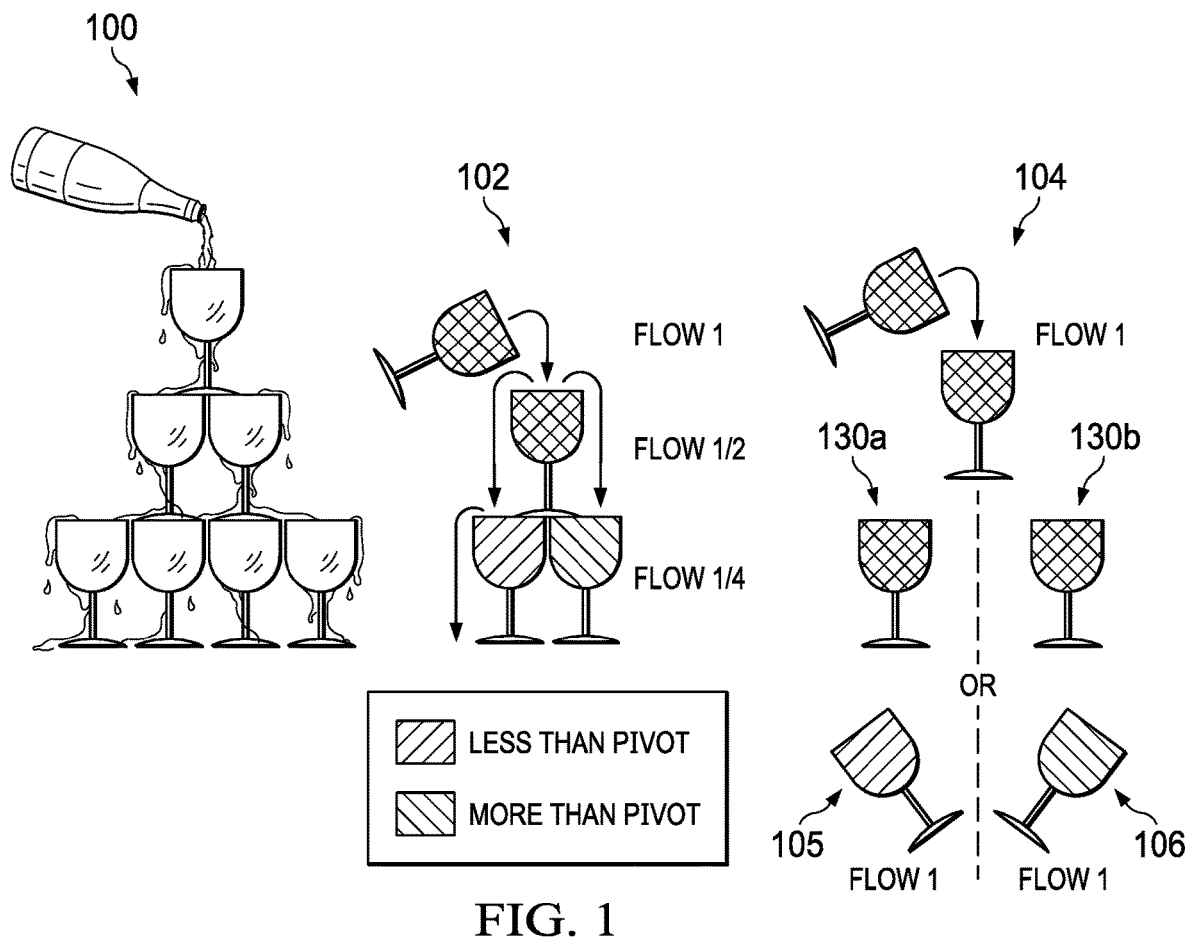
FIG. 1 illustrates a comparison between fluid flow in a Champagne tower and operation of an enhanced computational memory, in accordance with an illustrative embodiment.

For ease of reference, the sorting computational memory described herein may be referred to as "Superstrider," though this name does not itself describe the structure and operation of the illustrative embodiments. Such description is provided with respect to FIG. 1 through FIG. 22. Superstrider combines computation and memory into a single component that is directed by a control unit and can be integrated with a standard processor.

Again, Superstrider is a hardware component of a computer; specifically, Superstrider is a sorting computational memory. Superstrider may be built as a stand-alone memory for use in a computer, or inserted into or otherwise incorporated with an existing memory chip. To date, no hardware memory includes the ability to behave as a sorting network as part of the hardware memory. Superstrider thus significantly advances the art of hardware memory for use in computers.

More specifically, Superstrider is a processor-in-memory architecture described herein as a sparse matrix multiplication accelerator. Superstrider can be viewed as an extension of strided memory access, where the memory assists the processor by predicting addresses in advance. A processor can use Superstrider as regular memory, but can also use its internal data movement and processing capabilities, including floating point, to offload entire subroutines for algorithms like sparse matrix add, multiply, transpose. This capability allows Superstrider to benefit from technology developments, such as the bandwidth increases available through High Bandwidth Memory (HBM) or eventually from the efficiency of a fully integrated three-dimensional logic-memory stack. In fact, Superstrider is Turing complete and can be viewed as an accelerator for a broad class or algorithms or even a standalone processor. Superstrider uses a unique type of tree sort, as described further below.

Sparse matrix multiplication algorithms are an important component of many applications, and today's algorithms suffer from the von Neumann bottleneck at large scale. The term "von Neumann" refers to traditional computers familiar to most people, and the von Neumann bottleneck is a practical limit to computational speed in such traditional computers due to congestion in the interconnection between the processor and memory.

The von Neumann bottleneck is closely associated with the division of semiconductors into logic and memory chips. The computer architecture developed by John von Neumann decades ago, and ubiquitous today, divides computers into processors and memory. This division parallels the growth of the semiconductor industry through sales of two product families: logic chips such as microprocessors, and memory chips, such as DRAM. While there is a convenience to separating chips into logic and memory types, the need to grow the industry is prompting the development of chips with both logic and memory, of which Superstrider is an example.

The illustrative embodiments help overcome or mitigate the von Neumann bottleneck by increasing the speed at which memory can operate by a factor of hundreds or, for some algorithms, even a factor in the thousands. This improvement is discussed further below, with respect to the Figures.

FIG. 1 illustrates a comparison between fluid flow in a Champagne tower and operation of an enhanced computational memory that can sort records at high speed, in accordance with an illustrative embodiment. Thus, FIG. 1 shows an analogy to help illustrate what Superstrider does in computer memory. FIG. 1 should be considered only as an analogy, though at a conceptual level, the operation of Superstrider shown in the right portion of FIG. 1 is not an analogy, but rather demonstrates an algorithmic principle in the operation of Superstrider.

FIG. 1 shows fluid flowing over Champagne tower 100, abstract representation 102 of the fluid flow in Champagne tower 100, and abstract representation 104 of data flow in Superstrider executing a tree insertion algorithm. For abstract representation 102 of Champagne tower 100, imagine a Champagne glass holds a total of K type I records (shown as a first hashing type) or type II records (shown as a second hashing type) in lieu of Champagne molecules. In this case, pouring K records into a glass tree node that recurses to two similar operations of size approximately K/2, ultimately yielding O(N log N) steps, where N is the total number of records in the tree.

For abstract representation 104, Superstrider can sort based on record type, and yields asymptotically fewer steps. In abstract representation 104, middle glass 103*a* and middle glass 103*b* are skipped, with Champagne flowing to either left path 105 or right path 106 in the final Champagne glasses. If the amount poured at one time is the same as the capacity of a glass tree node (K records), sorting the 2K items by record type is guaranteed to yield at least K items of the same record type. Recursion will be needed only down the branch with the predominate record type (i.e., recursion becomes looping, which is more efficient) and the algorithm will have just O(log N) steps.

FIG. 1 is essentially a sparse-to-dense stream converter. Imagine the pyramidal Champagne tower in Champagne tower 100 to be a physical analogy of element insertion to a binary tree data structure in a computer, where each Champagne glass corresponds to a DRAM row holding K red or green records. The memory in common computers is called "DRAM," which stands for Dynamic Random Access Memory."

A regular tree insertion subroutine searches from the root downward through descendant nodes until the proper one has been found, after which the record is stored in its proper place. However, pouring Champagne into the tower has a feature not found in computer algorithms. Most of the Champagne poured into the top glass does not end up in its final glass after just one pouring, but will be temporarily held in glasses further up the tree until a later pouring causes it to move downward.

The problem is resistance to parallelization. If K records are added at the root all at once, like pouring a glass of type I and type II records into the top glass, the records will split at each level, as shown in abstract representation 102. Since each glass is analogous to a DRAM row, almost all the DRAM in the entire system will be accessed for even modest values of K, which is why the structure in abstract representation 102 experiences a lot of inefficient data movement between logic and memory chips for many problems.

Abstract representation 104 (which is an analogy for the operation of Superstrider) presents an idea that leads to a more efficient implementation, but requires the ability to sort DRAM rows efficiently. When K records are poured into a glass that contains another K records, Superstrider sorts these 2K records and puts them back in the glasses.

Using the terminology of tree algorithms, each row has a pivot. Records are designated as type I if their key is less than the pivot and designated as type II otherwise.

There are now two scenarios corresponding to the bottom halves of abstract representation 104. If there are K or more type I records, one glass will be entirely type I and the other glass will have mixed record types.

If there are less than K type I records, there must be more than K type II records, so the previous statement will be true with the record types interchanged. Now pour the glass where all the records are the same type down just one subtree and leave the other glass in its position in the tree. Simulation shows this to be very efficient for long sequences of additions, yet a cleanup phase, which may be called normalization, is required at the end to move laggard records to their ultimate destination.

The step count reduction is significant, that is more than an order of magnitude (a factor of ten). Adding a single element to a tree is an O(log N) operation in standard algorithm theory, where N is the number of elements in the tree. Superstrider can add K elements in this amount of time, making the average step count O(log N)/K, which captures parallelism but is not an order reduction. However, DRAMs are designed to be refreshed in 8,192 cycles, meaning they actually have 8,192 rows at some low level in DRAM electronics. If the number of rows is fixed, K∝N, then the step count reduces to O((log N)/N), which is an order reduction.

Figure 2:
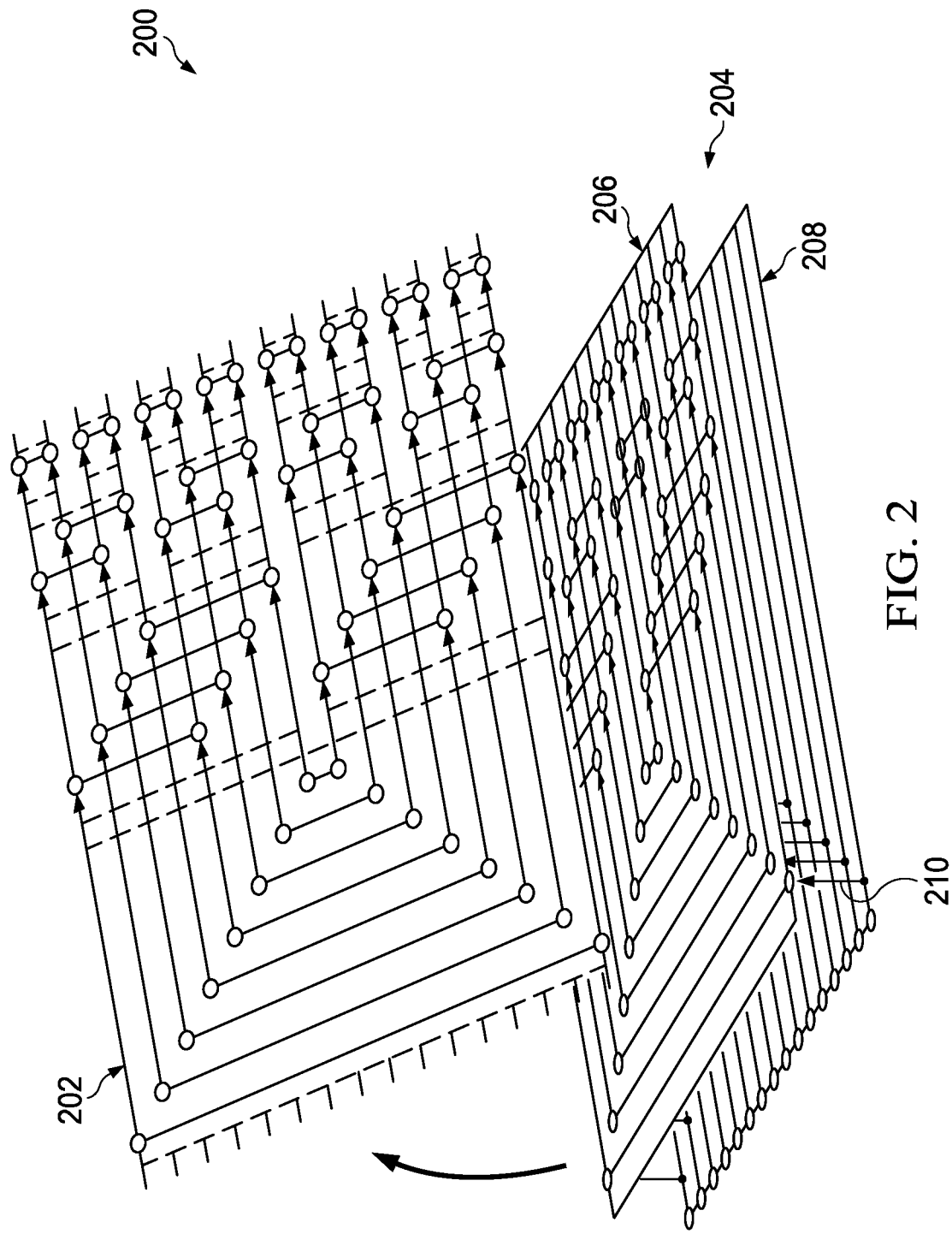
FIG. 2 illustrates a three-dimensional sorting computational memory module, in accordance with an illustrative embodiment.

FIG. 2 illustrates a three-dimensional sorting computational memory module, in accordance with an illustrative embodiment. At a high level, sorting computational memory 200 is Superstrider, and can perform the operations shown in abstract representation 104 of FIG. 1.

For highest performance, functions are defined as schematics and laid out to reduce communications latency and energy, such as the bitonic merge network indicated in top layer 202. This layer shows a functional schematic of a data flow layout.

Bottom layers 204 show a three-dimensional physical module with tight coupling between logic and memory that allows short connections instead of conversion of signals to high energy levels and off-chip delays. This layer shows a physical module logic layer 206 and memory layer 208 connected by a parallel interface 210 whose length is equivalent to the thickness of chips layers, on the order of a micron.

Although memory and storage are now implemented in three-dimensional structures, they are currently being used only in computers of the typical von Neumann architecture. So, even if scaling in the third dimension can extend Moore's law, unless the von Neumann bottleneck that is created by the bus between processor and memory is mitigated, computational efficiency (performance and energy efficiency) will not grow at the rates that drove economic growth over the past several decades.

The illustrative embodiments, referred to generally as "Superstrider," provide additional design flexibility brought out by the shift from two-dimensional to three-dimensional memory layouts, and the associated possibility of collocating logic and memory. Some very effective algorithms, such as merging (a type of sorting), become inefficient at large scale simply due to the large amount of data movement between logic and memory chips. Using a merge network as an example, three-dimensional integration makes the needed interconnection pathways possible and efficient.

Therefore, Superstrider may be characterized as a special class of accelerators, which, in conjunction with a traditional processor, alleviates the von Neumann bottleneck by collocating some computational functions and their associated memory access, enabling increased performance and energy efficiency over a broad class of applications. These applications include, but are not limited to, data analytics, graph processing, scientific algebra, and linear algebra. Superstrider itself is not a von Neumann architecture, as it combines computation and memory into a single component that is directed by a control unit and can be integrated with a standard processor.

Figures 3, 4:
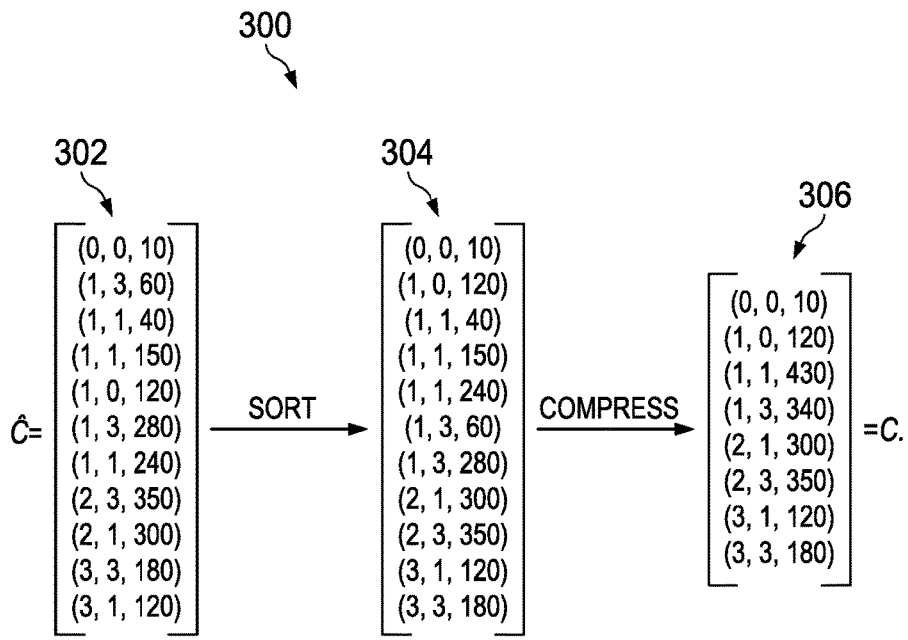
FIG. 3 illustrates an example of an expand-multiply-sort operation, in accordance with an illustrative embodiment.
FIG. 4 is a table showing how a computer system would use Superstrider, in accordance with an illustrative embodiment.

FIG. 3 illustrates an example of an expand-sort-compress operation, in accordance with an illustrative embodiment. Operation 300 is shown to assist in understanding the types of sorting operations performed by Superstrider, such as sorting computational memory 200 of FIG. 2. Operation 300 is taken in the context of sparse matrix multiplication. However, Superstrider may be used with many different types of operations.

Sparse matrix multiplication can be divided into multiplication and addition phases, with the addition phase sometimes called accumulation. In dense multiplication of matrices AB=C, each element $c_{ij}$ of C is the vector dot product of a row of A and a column of B, such that $c_{ij}=\Sigma_k a_{ik}b_{kj}$. If we define $\hat{c}_{ij}^{(k)}=a_{ik}b_{kj}$, many $\hat{c}_{ij}^{(k)}$ do not exist when A and B are sparse. When the sparsity pattern is too irregular to exploit, this can be treated as a data processing problem on a series of records of the form $\{i, j, \hat{c}_{ij}^{(k)}\}$.

The Expand-Sort-Compress (ESC) method illustrated starting in left column 302 of FIG. 3 shows an example sequence $\{i, j, \hat{c}_{ij}^{(k)}\}$. Processing involves sorting the products by indices to yield middle column 304, and then compressing the data by adding all values with the same indices. The result in right column 306 has the correct values for the sparse matrix product in what is essentially a sparse matrix data storage format.

Superstrider's principal function is to receive vectors of records in the form $\{i, j, \hat{c}_{ij}^{(k)}\}$, sort them into a standard form (lexicographic order of i, j), and sum all the values $\hat{c}_{ij}^{(k)}$ for a given (i, j). This operation is precisely the addition phase of sparse matrix multiply. However, Superstrider's function can be applied in other ways, as it is a general programming primitive.

First, if the records $\{i, j, a_{ij}\}$ are read out and fed back into an empty Superstrider after only changing the order of indices to $\{j, i, a_{ij}\}$, the transpose of the sparse matrix will end up stored in standard form.

Second, if the contents of two sets of records $\{i, j, a_{ij}\}$ $\{i, j, b_{ij}\}$ are fed into a Superstrider, the sum of the sparse matrices will end up stored in standard form.

Third, the complete matrix multiplication algorithm (not just the addition phase) can be performed on records $\{i, k, a_{ik}\}$ $\{k, j, b_{kj}\}$ by first transposing $\{i, k, a_{ik}\}$ to $\{k, i, a_{ki}\}$, calling a multiply function on $\{k, i, a_{ki}\}$ and $\{k, j, b_{kj}\}$ to form all products $\{i, j, \hat{c}_{ij}^{(k)} = a_{jk} b_{kj}\}$ and sending the data to an empty row in the memory.

Fourth, Superstrider may be applicable to any problem in the class represented by the GUPS benchmark, has very similar behavior to the problem above. The GUPS benchmark uses a one dimensional array T[i], which can hold array C via the mapping $T[n(i, j)] \equiv \hat{c}_{ij}$ for some invertible mapping function n. In the GUPS scenario, the accumulation becomes $T[n(i, j)] + = \hat{c}_{ij}^{(k)}$ for all k where $\hat{c}_{ij}^{(k)}$ exists.

FIG. 4 is a table showing how a computer system would use Superstrider, in accordance with an illustrative embodiment. Table 400 defines these terms and provides a context for how Superstrider, such as Superstrider 200 of FIG. 2, fits into a computer architecture. Table 400 defines the high-level part of a system containing Superstrider as a microprocessor (row 402), while the illustrative embodiments include a middle layer comprising a controller that interprets a tabular control block (row 404), and a low layer containing an arithmetic and logic unit (ALU) (row 406).

Superstrider is a non-von Neumann architecture intended to be a lower-level component of a larger computer system. In today's popular thinking, Superstrider would be an accelerator in a system based on a microprocessor, as shown below in FIG. 5 and FIG. 6; although, there are other ways to make a computer system using Superstrider.

Figure 5:
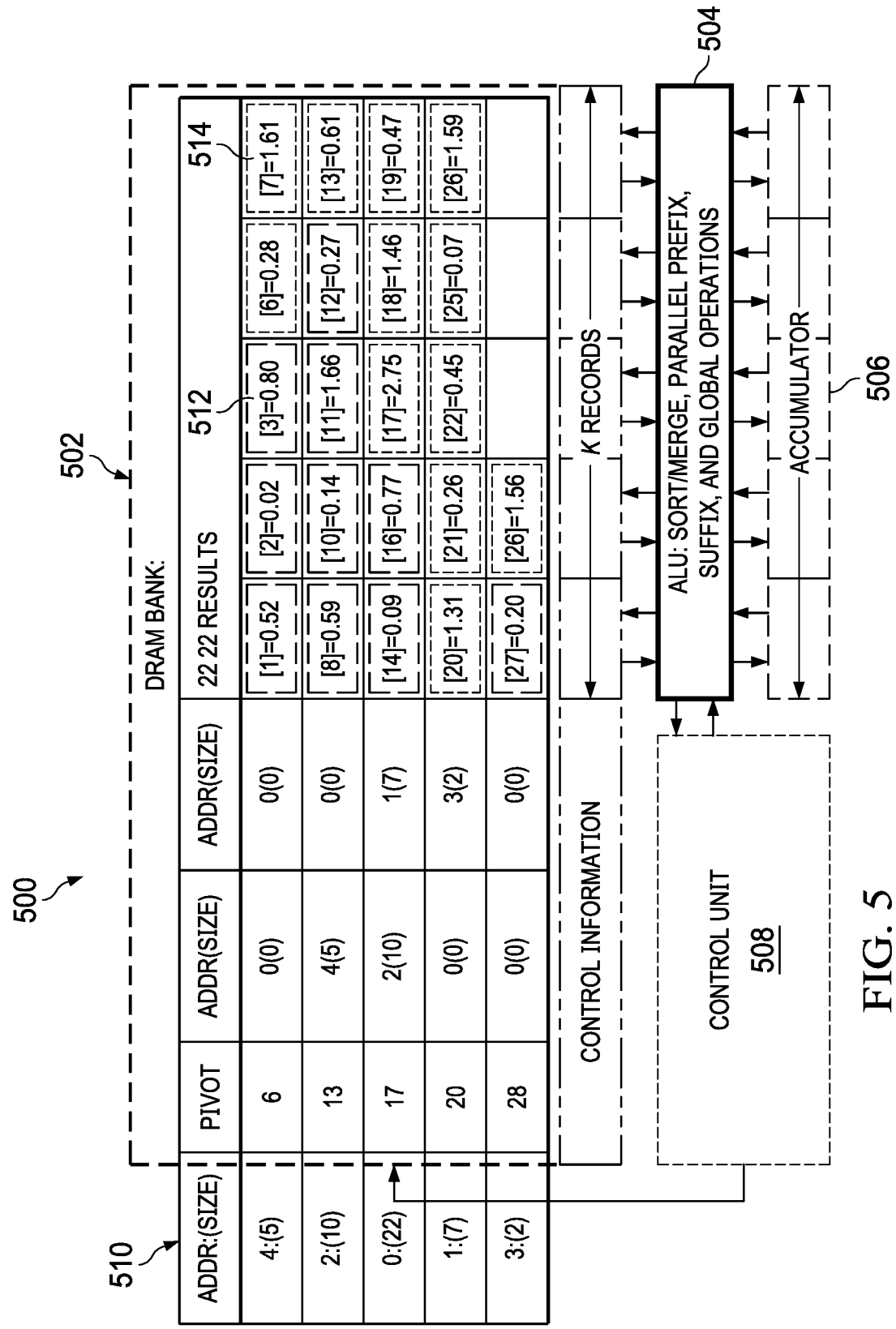
FIG. 5 illustrates a structure of a sorting computational memory, in accordance with an illustrative embodiment.
Figure 6:
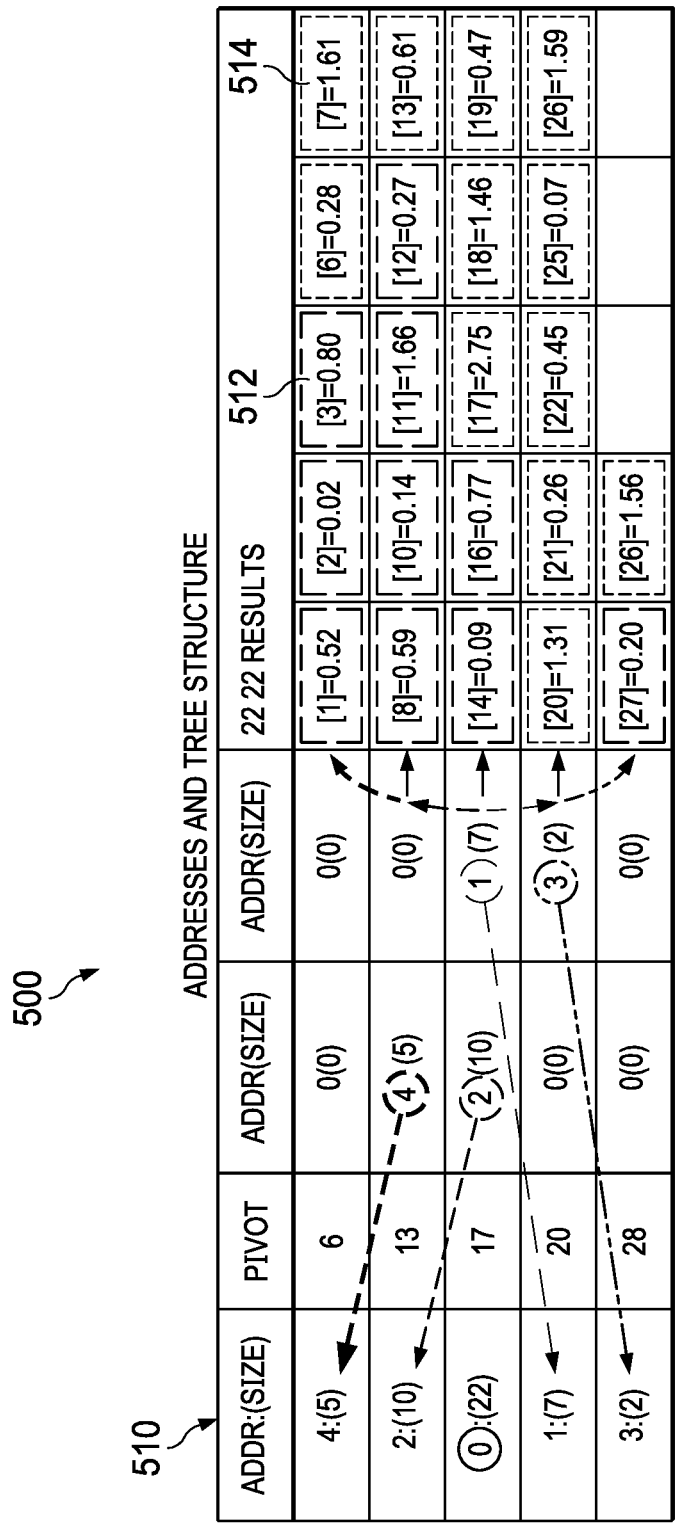
FIG. 6 illustrates using control fields to organize a computational memory's rows into a binary tree, in accordance with an illustrative embodiment.

FIG. 5 illustrates a structure of a sorting computational memory, in accordance with an illustrative embodiment. FIG. 6 illustrates using control fields to organize a computational memory's rows into a binary tree, in accordance with an illustrative embodiment. FIG. 5 and FIG. 6 should be considered together, and thus share common reference numerals. Structure 500 shows the architecture of Superstrider, such as Superstrider 200 of FIG. 2.

Superstrider architecture 500, includes a memory bank (in this case shown as DRAM bank 502). Again, "DRAM" means "Dynamic Random Access Memory." Superstrider architecture 500 also includes arithmetic and logic unit 504 (ALU), accumulator 506, and control unit 508.

In other words, in this illustrative embodiment, Superstrider's memory is a DRAM bank illustrated with rows of K=5 records, each of which may be either type I or type II. The contents of each are in the format [key]=value, so a term of $\hat{c}_{ij}^{(k)}$ would appear with the notation $[n(i, j)] = \hat{c}_{ij}^{(k)}$, where n(i, j) is the invertible function mapping two integers to one. It is possible for the same key to appear multiple times, so [4]=2.3 and [4]=1.2 could appear in the same or different rows.

This particular example uses DRAM to illustrate the memory bank, where 16,384-bit rows are divided into a control section of a few hundred bits (boxes 510 with no hashing) and a far larger data section that can hold K type I data records (boxes 512 with a first type of hashing) and also type II records (boxes 514 with a second type of hashing).

As shown in FIG. 6, hardware uses the control fields to organize the DRAM's rows into a binary tree. The accumulator has K data records, making it size-compatible with the memory's data. The external processor has a read/write data connection to the accumulator and the ability to communicate bus status to the control unit (neither shown).

Superstrider's main cycle is to access a row of DRAM 502, pass the DRAM's and accumulator's data through arithmetic and logic unit 504, and store the result back to the same row of memory and the accumulator 506. This cycle is analogous to abstract representation 104 of FIG. 1, where two glasses of Champagne are sorted to yield a glass full of one type and a second glass of mixed types. Partway through the main cycle, arithmetic and logic unit 504 provides data signals to control unit 508, leading control unit 508 to immediately instruct the arithmetic and logic unit 510, which function to perform in the remainder of the cycle. Again, this cycle is equivalent to abstract representation 104 of FIG. 1, where the system may proceed via the left path 105 or right path 106. Control unit 508 also specifies row addresses for each cycle and manages control information, such as, but not limited to, a freelist, tree structured data, and subroutine return addresses.

From the above, it is apparent that Superstrider's program and data components differ fundamentally from a von Neumann computer architecture. Thus, the illustrative embodiments are capable of orders of magnitude greater performance than a traditional von Neumann computer.

Attention is now turned to the arithmetic and logic unit 504 (ALU). Superstrider has an additional processing layer in the data path compared to the von Neumann architecture. Superstrider's control unit can orchestrate ALU operations in very much the same way as a von Neumann processor, but, for K>1, each ALU operation operates on multiple data items using a different method.

While vector and single instruction multiple data (SIMD) computers perform the same operation on many data items, Superstrider's arithmetic and logic unit performs a more complex, programmable, function that is an additional processing level. The arithmetic and logic unit is described in detail later, but, in summary, it has a programmable log-depth network connecting 2000 (2K) data records. This network can sort/merge, perform parallel prefix/suffix, global operations, and reverse merge or distribution. These network operations are performed on what are essentially application-specific data structures with definable algebra.

This fact means the network arithmetic and logic unit is controlled by defining the data format and arithmetic operation for each stage of the network arithmetic and logic unit, and a few other details as described below. While programming the network arithmetic and logic unit is unusual and probably challenging, it is part of getting increases in speed and energy efficiency of a factor of a thousand or more.

Furthermore, Superstrider's performance advantage grows with increasing K, at least in some cases. For example, a Superstrider mode for high bandwidth memory should accommodate K≈250, but simulation shows that K≈2,000 would give much better results.

In summary, Superstrider should be seen as an architecture that scales with increasing memory bandwidth, much of which would come through a growth in memory width, K. With large K, Superstrider could be seen as a two-level structure. The lower level 406 of FIG. 4 is a somewhat configurable network arithmetic and logic unit that processes whole DRAM rows at once, each row containing K records. A table-driven intermediate level 404 of FIG. 4 implements tree structured algorithms on the memory contents that have been organized into a tree data structure where the nodes are entire DRAM rows. The highest level is a microprocessor that can access Superstrider as a memory or can set the control logic in motion to perform a useful function.

In one non-limiting illustrative embodiment, Superstrider's data path is based on a butterfly network with various arithmetic and logic unit features, which is like a vector arithmetic and logic unit with the ability to sort its contents. The butterfly network has 2000 (2K) ports, making it the width the memory's selected row buffer and the accumulator combined, treating the two K-record registers as a single 2K-record register.

For a tutorial regarding the structure of the arithmetic and logic unit, see FIG. 9, below.

Figure 7:
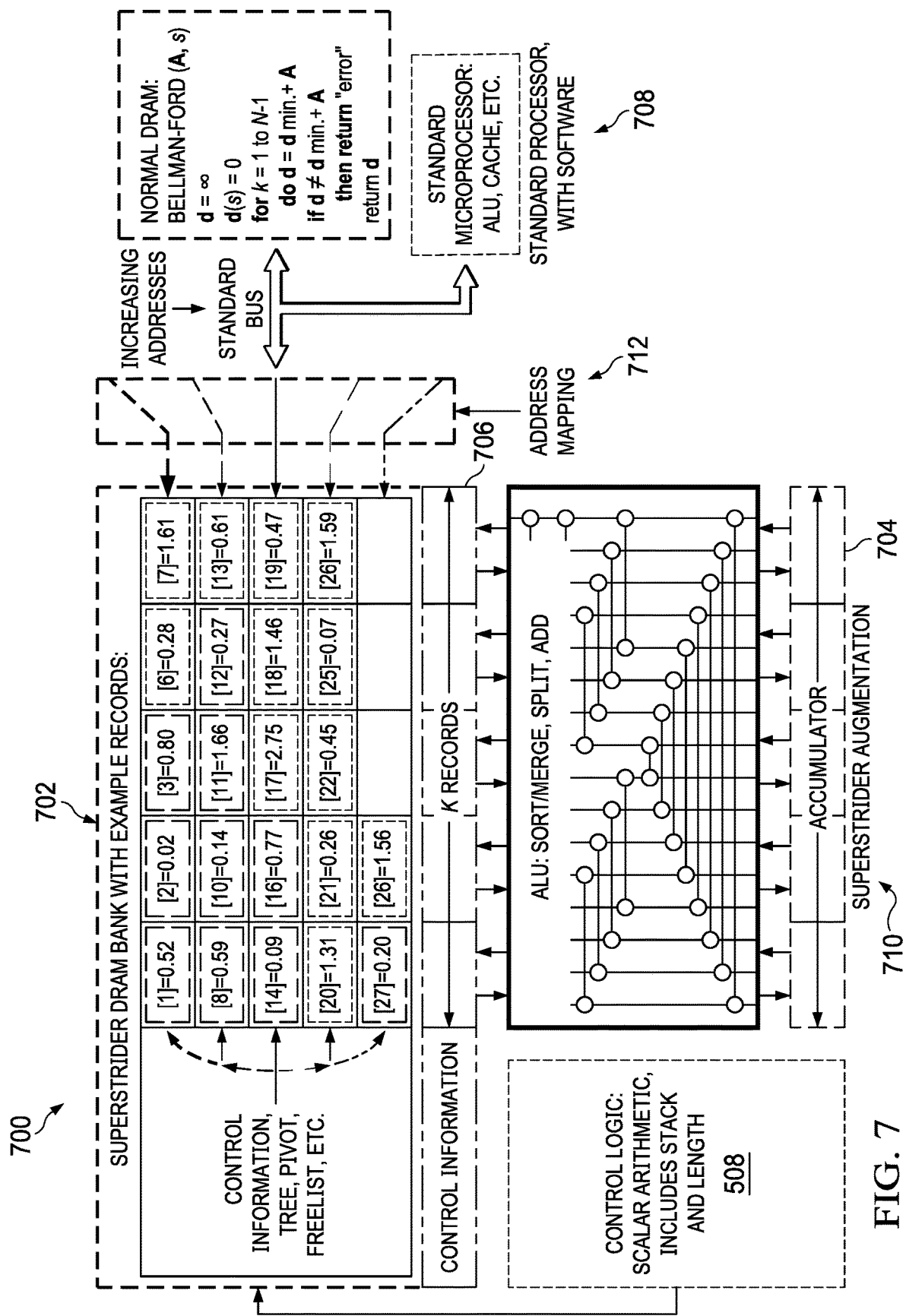
FIG. 7 illustrates a hybrid sorting computational memory being used with software, in accordance with an illustrative embodiment.

FIG. 7 illustrates a hybrid sorting computational memory being used with software, in accordance with an illustrative embodiment. Superstrider architecture 700 is an extension of Superstrider architecture 500 of FIG. 5 and FIG. 6. Specifically, the hybrid Bellman-Ford algorithm is illustrated.

In this extended Superstrider architecture, Superstrider's data path is like an early computer with a memory and an accumulator, yet with a word size as wide as DRAM 702, which is 16,384 bits or larger. This structure effectively gives Superstrider two data registers called accumulator 704 and the DRAM's selected row buffer, buffer 706. Data in memory and registers are organized as groups of K records, which are stored in sorted order, and control information. The control information includes the pivot and the indices of subtree rows.

The control logic implements a basic computational step and a series of control operations. The basic step is to read a row of memory, merge the (already sorted) accumulator and selected row buffer into a double-length sorted list, compress or reduce the sorted data, write one part of the double length buffer back to memory, and leave the rest in the accumulator for the next step. There is no program in the sense of a von Neumann computer. Instead, there is a parallel implementation where the step just described takes just one clock cycle. Control operations include managing the tree, setting pivot values for sorting, managing a freelist of available memory rows, and implementing several control flow paradigms.

Attention is now turned to an exemplary usage scenario. Say an engineer's task is to create an artificial intelligence system that uses data analytics to draw inferences from information in a set of documents. The engineer could first download data analytics software based on the D4M associative array paradigm to a conventional von Neumann computer, say, his or her laptop, which has the architecture shown in section 708 of FIG. 7. D4M is an open source programming system that includes a flexible software implementation of associative arrays. Higher-level data analytics code would create associative arrays on the fly to hold, for example, graphs of the interactions between ideas in documents. The higher-level software would draw inferences from the graphs by making various D4M subroutine calls operating on associative arrays.

Execution efficiency at large scale will be limited by the fact that the laptop's microprocessor and memory are in the form of a von Neumann computer, but at some point in the future, the engineer would install a Superstrider module into the laptop's memory slot. This addition would augment the computer with the Superstrider architecture in section 710 of FIG. 7.

Attention is now turned to an address remapping interface. Superstrider and laptops optimize memory addressing to different objectives, which may require an interface to make them compatible. All modern DRAM chips are big enough to contain multiple banks. Superstrider operates on data within a single bank at a time, but conventional computers interleave data, so it is divided into small chunks that are maximally distributed across many memory banks.

This structure has been invisible to programmers because memory bits do not interact with each other. Thus, it does not matter, functionally, where a bit is located in terms of bank, row, or column. However, interleaving is very important to the performance of today's computers.

The interface shown in area 712 of FIG. 7 allows the programmer to access data in associative arrays naturally, with associative arrays stored in the Superstrider banks, rows, and columns so they connect properly to the sorting networks that Superstrider uses to process the data. For example, the data emerging from all the bits of a row of memory can be sorted efficiently, but it is difficult to sort the data in column 1 of every row of a memory.

Thus, the interface shown in area 712 of FIG. 7 illustrates a possible interleaving pattern, where the DRAM rows holding associative array "A" alternate with other DRAM rows holding other information, from the perspective of a program running on the microprocessor. Then, D4M or some other software library would remap memory addresses so each associative array will be in a single memory bank. This may be accomplished using hooks into the systems software to allow a user-level program to allocate Superstrider memory banks into its address space, receiving information in return on the precise address remapping being performed by the operating system and hardware so it can be reversed.

An additional usage scenario is now presented. Superstrider's functions can be enabled now that the data has been suitably organized. The D4M library, or equivalent, has many functions, some of which may be more efficient when directly executed on the microprocessor. So, for example, the D4M sparse matrix multiply subroutine might be modified to test the sizes of the two matrices and invoke Superstrider if both have more than 100 entries.

Other use cases are also possible. For example, high bandwidth memory (HBM) creates a three-dimensional stack of chips near or on top of logic and fully integrated three-dimensional logic-memory stacks. In another illustrative embodiment, a sparse matrix accelerator may be provided, for the latter three-dimensional structure, where a main processor loads sparse matrices in the accelerator's memory using normal load-store access.

Figure 8A:
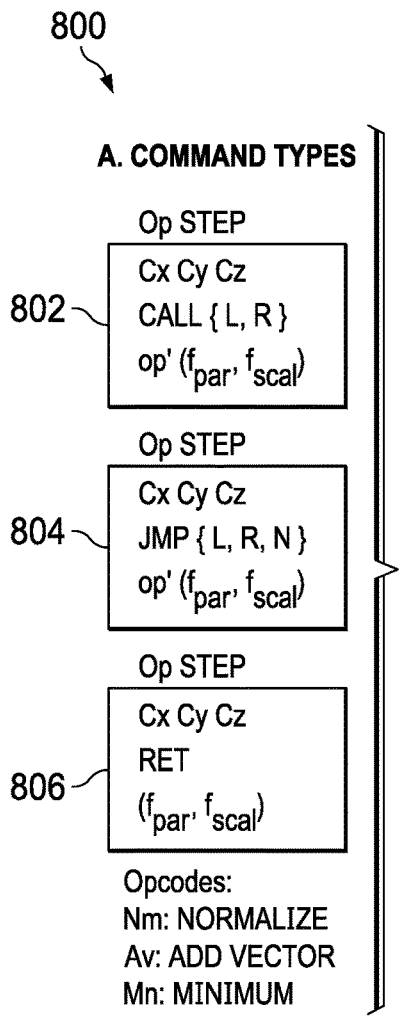
FIG. 8A shows Superstrider's three command types, CALL, JMP, and RET, as unassociated building blocks, in accordance with an illustrative embodiment.
Figure 8B:
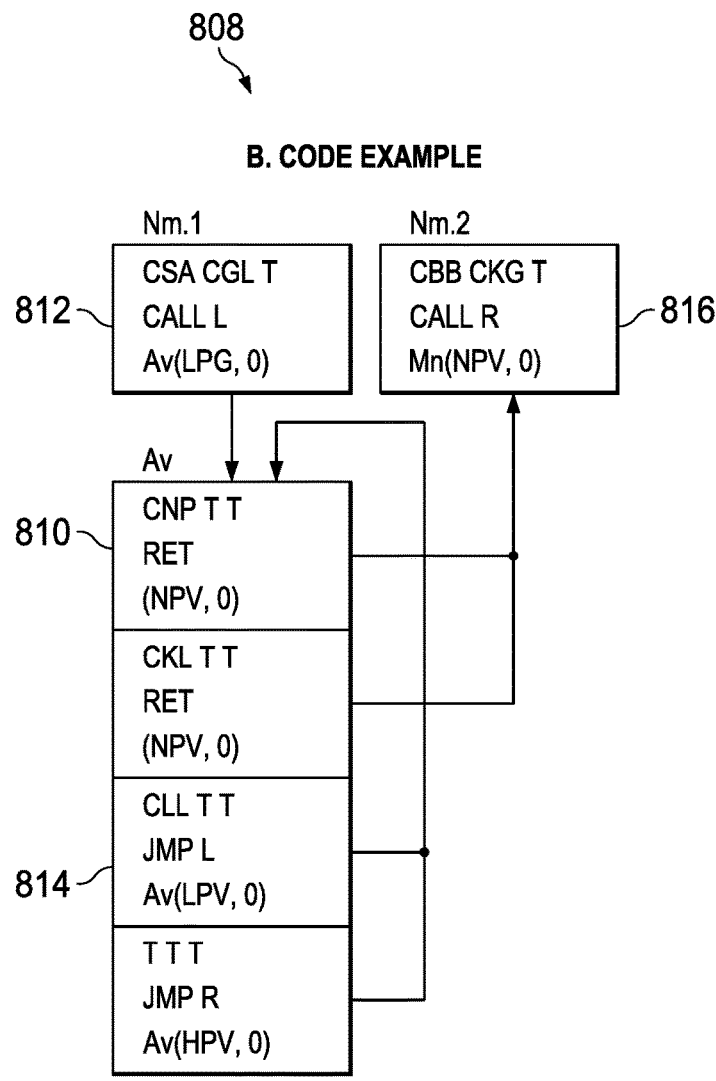
FIG. 8B shows control features, or a code example, using the commands shown in FIG. 8A, in accordance with an illustrative embodiment.

FIG. 8A shows Superstrider's three command types, CALL, JMP, and RET, as resources not yet allocated to any function, in accordance with an illustrative embodiment. FIG. 8B shows control features, or a code example, using the commands shown in FIG. 8A, in accordance with an illustrative embodiment. FIG. 8A and FIG. 8B should be viewed together. Together, FIG. 8A and FIG. 8B provide a specific example of command types and operations in Superstrider, as illustrated in FIG. 5 through FIG. 7.

Superstrider's sequence of memory row accesses is roughly equivalent to the instruction stream of the von Neumann architecture. Each Superstrider cycle designates the row number and opcode for the next cycle, making the combination {row, opcode} Superstrider's equivalent to the program counter in a von Neumann computer.

Superstrider uses a control block of commands to manage this process. Commands with the same opcode cooperatively implement a function, such as inserting records into a tree. The three types of commands, CALL, JMP, and RET (return), implement a type of recursive subroutine capability using control information in memory rows as the functional equivalent of a stack.

FIG. 8A shows Superstrider's three command types 800, CALL 802, JMP 804, and RET 806. Functionally, opcode Op, the step number, and conditions Cx, Cy, and Cz, control when a command is invoked. Invocation always executes function $f_{par}$ (parallel) to create K-record parallel data that is written back to memory and to the accumulator as input to the next cycle. Function $f_{scal}$ (scalar) creates a scalar value for the next cycle. The CALL 802 and JMP 804 commands may designate the row number of the left (L) or right (R) subtrees or the next (N) row in memory for the next cycle. The RET 806 command designates the original caller's row number for the next cycle. If a function specifies step numbers, the commands are laid out horizontally with op.step above each rectangle.

FIG. 8B represents code example 808. The hardware assures that steps are executed in order; commands without steps specified may be executed in any order and are laid out vertically. As also used elsewhere herein, for FIG. 8A and FIG. 8B, the term "ALU" refers to "arithmetic and logic unit."

Superstrider's control features will be explained using the commands in FIG. 8B as an example. The commands have been extracted from the normalization (Nm) function for a Superstrider tree that is used in this document. At step Nm.1 810, some records need to be transferred to the left subtree, which is done by calling the function add vector (Av) that is implemented by the four commands below. The control flow will be followed without further attention to the data.

Invocation of Nm.1's 810 CALL command designates add vector (Av) and the left (L) subtree for the next cycle, using data path function LPG (defined as "below-pivot records beyond the goal to left side") to put these records in the accumulator. Superstrider hardware then accesses the memory row for the left subtree's root and runs the first part of a network ALU cycle. Information directly from the row and from the ALU are used to compute 16 Boolean condition codes with names like Cxx (and T for true). Superstrider's hardware searches the control block for the first command with the specified opcode Av where all the condition codes Cx, Cy, and Cz are true.

Command 812 is the first match in this example, which is condition code CLL (defined as "LT>=GE," where LT is the number of records less than the pivot and GE is greater-then-or-equal). Command 812 is a CALL that designates the opcode Av and the left subtree's address for the next cycle. However, the ALU will first complete ALU processing with opcode LPV (defined as "up to K below-pivot records to low side") and the scalar value is zero because it is unused.

For this example, assume command 812 repeats a number of times, causing Superstrider to walk down the tree until it reaches a leaf. At the algorithmic level, the purpose of these cycles is to perform the LPV function on each node on the way down the tree. However, command 812 will eventually reach a leaf and try to jump into a non-existent subtree. Superstrider's hardware detects this situation and "demand allocates" a root node for a subtree from the freelist of rows, initializing the row. Initializing a row sets the pivot to −1 indicating the pivot has not been set.

The unset pivot causes the CNP condition code, defined as "row→Pivot( )==−1," to be set in the next cycle, which causes invocation of command 810. After performing NPV (defined as "no data operation; assure pivot set"), Superstrider returns to the row number on the stack embedded in the tree, as mentioned earlier.

In this example, the caller of Av was the Nm.1 command 812 at the top of the diagram. Superstrider supports functions with steps or no steps. If steps are used, Superstrider will only invoke commands in ascending order of the steps, resetting the step count when the function is first called. Steps are specified in Nm, so Nm.2 816 could be invoked if its conditions were satisfied. If steps are not specified, commands can execute multiple times in any order.

The control block for the illustrations in FIG. 8A and FIG. 8B implement five functions. These functions are Normalize (Nm), Maximum (Mx), Minimum (Mn), Clear (Cl), and Add vector (Av) using 22 commands. There are 16 conditions and 14 datapath operations.

Figure 9:
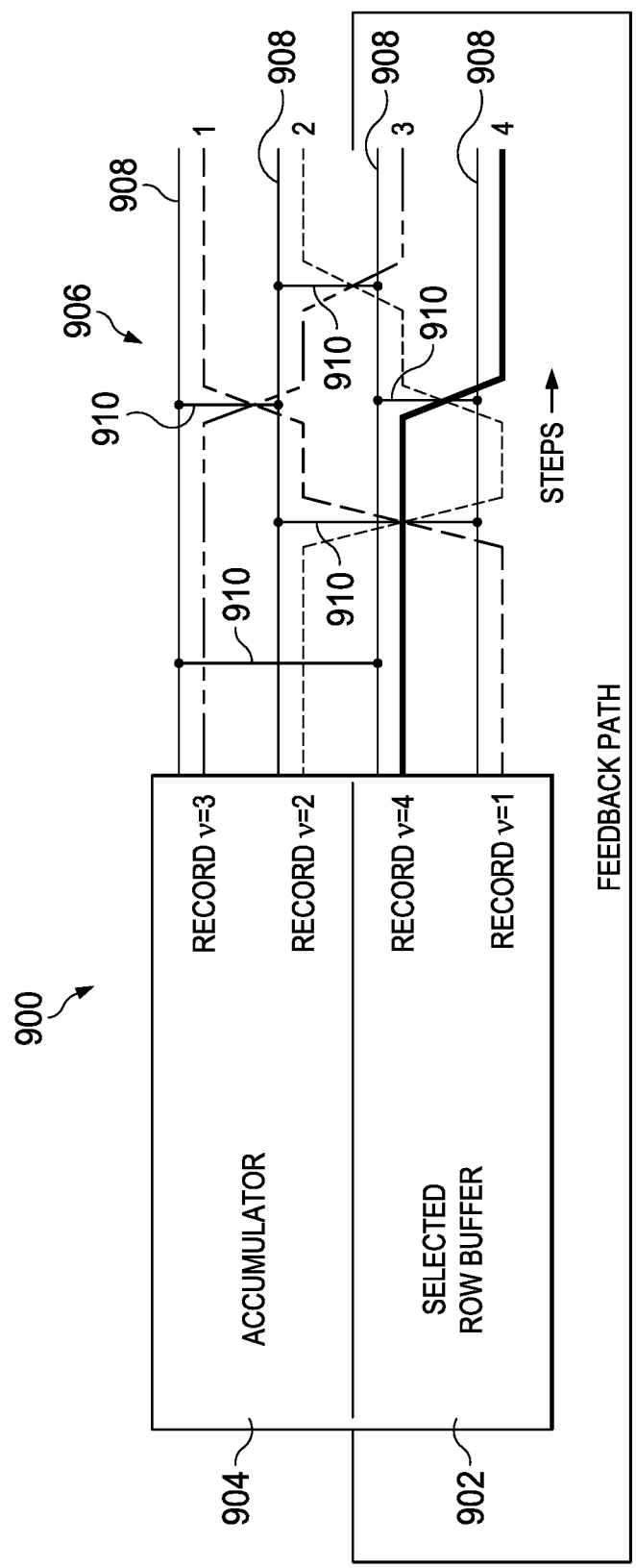
FIG. 9 is an illustration as part of a tutorial on the structure and operation of an arithmetic and logic unit in Superstrider, in accordance with an illustrative embodiment.

FIG. 9 is an illustration as part of a tutorial on the structure and operation of an arithmetic and logic unit in Superstrider, in accordance with an illustrative embodiment. Arithmetic and logic unit 900 has a subset of the features in arithmetic and logic unit 504 of FIG. 5 and FIG. 6, or the arithmetic and logic unit shown in FIG. 7.

The network arithmetic and logic unit structure will be explained in stages. As an example only, FIG. 9 shows a K=2 selected row buffer, shown at box 902, and accumulator, shown at box 904, and a small sorting network, shown generally at area 906. However, this tutorial sorting network is an indirect network but not in the form of a butterfly network.

One network input connects to each arithmetic and logic unit record, with the network's outputs wrapping around to the register inputs. Horizontal lines 908 represent record movement from left to right, and vertical lines 910 are comparison modules that compare the records as they pass, swapping them if needed so the record with the larger key is on top. As shown, the structure is able to sort the combined selected row buffer and accumulator.

This ordering allows an on-the-fly compare-and-swap module with one clock-cycle delay. Each compare-and-swap module has three states: "unset," "swap," and "noswap," and is initialized to "unset" prior to the first bit of key arriving. This fact means a module will be in the "unset" state when the first key bit is compared. As long as the key bits are the same, the identical bits are both passed to the output and the state stays "unset"; since the bits are the same, whether they are being swapped or not is moot. When a module's state is "unset" and key comparison reveals different bit values, the key with the "1" bit can be designated larger key. The larger keys are destined for the top in FIG. 9, so if the larger key is not on the top of the vertical line, the module's state is set to "swap"; otherwise "noswap." For this key bit and all that follow, the bits are either swapped or not based on the state and the state is left the same. If the keys are identical, the module will still be in the "unset" state after the last key bits are compared, in this case the state is set to "noswap" to avoid the system sorting on data values rather than the key.

Furthermore, Superstrider merges rather than sorts, saving both time and hardware. Superstrider sorts records before storing them in memory, allowing the assumption that all memory reads produce sorted records. Likewise, arithmetic and logic unit operations sort records left in the accumulator at the end of an instruction. Since the lists are sorted individually, combining them into a longer sorted list is called merging, which has fewer steps than sorting.

Figure 10:
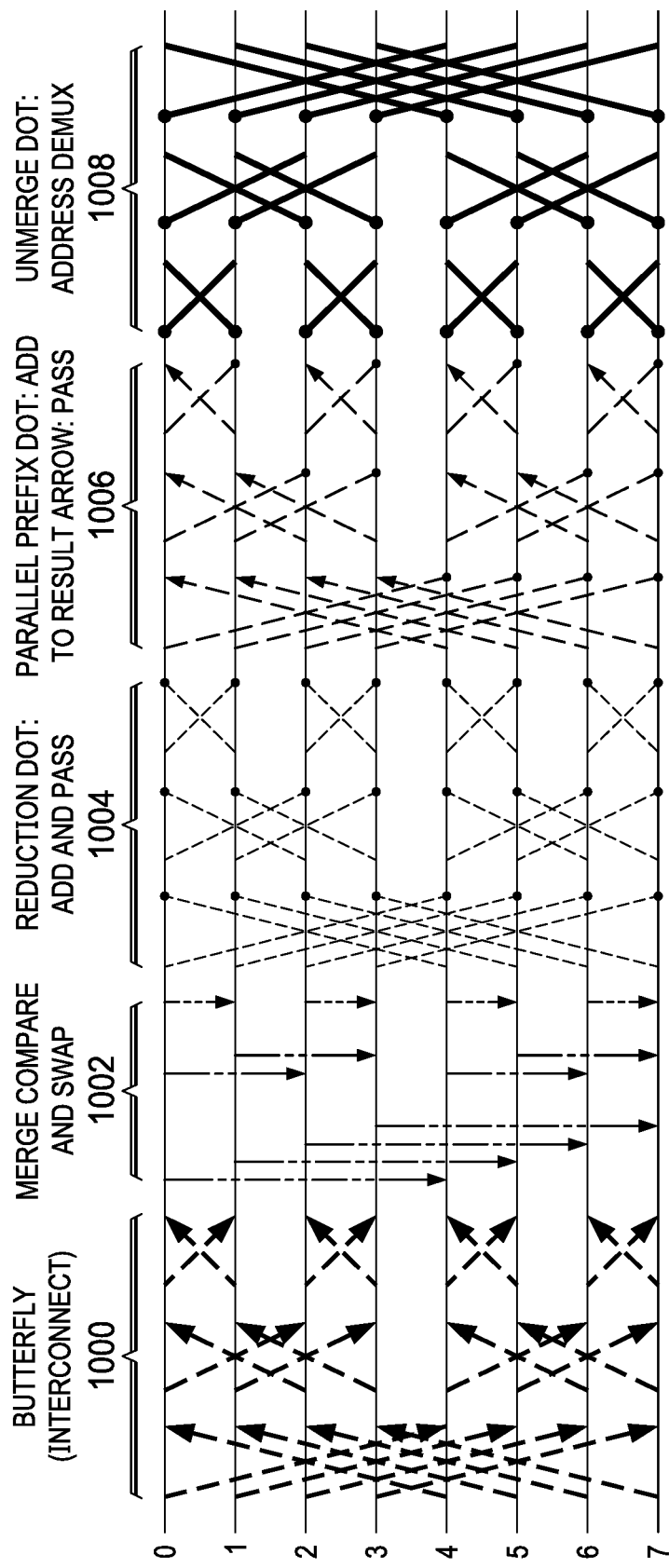
FIG. 10 illustrates butterfly interconnection and its application to merging, reduction, parallel prefix, and unmerge operations, in accordance with an illustrative embodiment.

FIG. 10 illustrates butterfly interconnection and its application to merging, reduction, parallel prefix, and unmerge operations, in accordance with an illustrative embodiment. FIG. 10 is a variation of the example shown in FIG. 9. Shown in FIG. 10 are butterfly interconnect (area 1000) and its application to merging (area 1002), reduction (area 1004), parallel prefix (area 1006), and unmerge (area 1008).

In FIG. 10, Superstrider merges using the butterfly network shown for K=4 on the left of FIG. 10, but it can also perform several types of parallel arithmetic by varying the behavior of modules. FIG. 10 illustrates five repetitions of a butterfly or hypercube interconnection pattern between records. Each of the eight black horizontal lines represents a record, where each record's identifying number appears on the left. The various diagonal lines crossing between records represent wiring and a functional module that operates between records at either end of the wire. Wiring is an expensive resource in large systems, so wires between each pair of records are reused when appropriate and the modules will perform various functions as controlled by a selector. In FIG. 10, each of the stages shown at areas 1000 through 1008 uses a similar wiring pattern. Specifically, record a connects to all other records whose address b differs by one bit when a and b are represented as binary numbers.

The first stage in area 1000 shows the butterfly interconnection pattern as a point of reference for the other stages. The second stage in area 1002 illustrates Batcher's bitonic merge. Each arrow in area 1002 is a module in the sense of FIG. 9, whose function is to compare the indices of the records at each end and swap the records if necessary so the record with the larger index is on the end with the arrow. If bitonic merging is to function properly, the order of indices in the input sequence must be bitonic, where bitonic means the indices increase, reach a maximum value, and then decrease to a minimum value—or any rotation of such a sequence.

For example, {1, 2, 3, 4} and {9, 8, 7, 6} are sorted lists in ascending and descending order, so their concatenation {1, 2, 3, 4, 9, 8, 7, 6} is bitonic. The concatenation of lists of unequal length {1, 2} and {9, 8, 7, 6, 5, 4} yields the bitonic list {1, 2, 9, 8, 7, 6, 5, 4}. However, the merge networks in this document can also deal with a rotated bitonic list, such as {5, 4, 1, 2, 9, 8, 7, 6}, a rotation of the previous sequence.

The third stage in area 1004 is a reduction. The simplest example of reduction is parallel sum on records containing a number, which adds all the values and distributes the sum to all the records. For example reduction(+) {1, 2, 3, 4} is {10, 10, 10, 10}.

Reduction can be performed on other data types and addition can be replaced by any associative operation. An engineer can define the values $v_n$ as a data structure with multiple fields, where each field could be an int (integer) or float (floating point number). At each module at level k, the $v_n$ are duplicated, keeping one copy where it is and sending the other copy down the wire to record labeled n⊕Δ, for some $\Delta=2^k$ due to the butterfly pattern. When the transmitted records are subsequently received in parallel by all the modules at level k, the dot on the wires indicates the v's are combined by the associative operation $f(v_n, v_{n \oplus \Delta}) \to v'_n$. The butterfly pattern creates a tree from all input records to each output record. Each output is the result of applying f to all the inputs, yet in different orders, but since f is associative, all outputs will be the same.

The fourth stage in area 1006 is a parallel prefix operation, which is defined for an associative operation ⊕ applied to a list of data. If a list is {a, b, c, d}, the prefix of each list element is the list of all elements to its left. For example, the prefix of the third element c is {a, b} because a and b are the left of c. Parallel prefix applies ⊕ to all the elements of each prefix and returns the list, so prefix(⊕) {a, b, c, d} is {0, a, a⊕b, and a⊕b⊕c}.

Parallel prefix is very similar to reduction except that all the data transfers pointing up have an arrow while those pointing down have a dot. Parallel prefix includes the data transmission and computation pattern for reduction, but all inputs received from lower numbered records are combined separately within each record. If the dots and arrows are reversed, the operation becomes parallel suffix.

The final stage, shown at area 1008, is the reverse of a bitonic merge, which could be called bitonic unmerge, or constrained data routing. If a binary address is created for each record, records can be moved to other destinations by the dots either swapping a pair of records as they flow past in time, or not swapping them. This process is the reverse of bitonic merge, but bitonic merge makes the decision about whether to swap or not by comparing the index fields. However, when reversing the merge, the index fields will be in the correct order, so a different method of deciding whether to swap is needed. The decision can be made based on each link corresponding to flipping a specific bit in the address. Records will be swapped if necessary to make the specific bit in the address correct. The method just described cannot perform an arbitrary permutation, but any permutation that could be constructed by a bitonic merge can be reversed—which is all that is required by Superstrider.

FIG. 11 illustrates an example of a sorting computational memory operation on sample data, in accordance with an illustrative embodiment. FIG. 12 illustrates a continuing example of a sorting computational memory operation on sample data, in accordance with an illustrative embodiment. FIG. 11 and FIG. 12 should be read together.

The operation of Superstrider's sort-compress process is shown in table 1100 and area 1102, which are derived from a live spreadsheet. In this example, K=4.

The following description applies to both FIG. 11 and FIG. 12. The difference between these figures is that the input at cell 1202 changed to the value "2" from the value "3" in cell 1102. Because the input now includes another duplicate value of "2," the result of the merge function is that now four rows of the value "999" appear in the results of FIG. 12, relative to three results of the value "999" appearing in the results of FIG. 11. The value "999" simply indicates that all records that had the input "2" were merged, and thus an empty slot is reflected by the value "999." In this manner, FIG. 11 and FIG. 12 together show the merging function of Superstrider. Details of this process are now described, with headings to indicate the order of operations.

Input (1): Input includes two lists of four [key]=value groups. Each list should be sorted so the largest key is at the bottom.

Reverse (2): Reverse the order of the lower list, making the input bitonic. Specifically, the first four [key]=value pairs have keys in ascending order and the second four are in descending order. This stage is for the reader's convenience and entering values in the associated spreadsheet; the system's architecture should be set up to store either the accumulator or selected row buffer upside down.

Merge (3): Bitonic merge of the two K=record lists, the resulting list comprising $\{k_n, v_n\}_f$ n=0 . . . 2K−1, largest key on the bottom.

Parallel Prefix (4a): Parallel prefix computes the proper sum for each key, albeit with records destined to be deleted still in place. The parallel prefix data structure comprises structures $\{k_j, v_j\}$ or $[k_j]=v_j$ and the associative operation is $f([k_1]=v_1, [k_2]=v_2) \rightarrow [k_2]=(k_1==k_2 ? v_1+v_2:v_2)$, which sums the values with equal indices, resetting the accumulating sum whenever the index changes.

One additional step is present. The result of parallel prefix on record n is $p_n=v_0 \oplus v_1 \ldots \oplus v_{n-1}$, which does not include the value in record n, which is one operation short of what we need, so the final step is $V_n=f(p_n, v_n)$.

Reduction (4b): In parallel with 4a, a network reduction computes the number of valid or non-deleted records that will appear in the output, which will be the same as the number of distinct keys in the records. However, the reduction computes the number of changes in keys when traversing the sorted list of keys. The number of changes is called t, which is one less than the number of distinct keys T=t+1. For example, the keys in the example are $\{1, 2, 2, 2, 3, 4, 4, 7\}$, so there are four key changes $\{1 \rightarrow 2, 2 \rightarrow 3, 3 \rightarrow 4, $ and $4 \rightarrow 7\}$ and five distinct keys $\{1, 2, 3, 4, 7\}$ so t=4 and T=5.

Each reduction data structure represents the keys and the number of key changes in a contiguous subset of the records, but the shortened form $\{s, e, t\}$ can be used, indicating the contiguous range of keys starting with s (start) and ending with e (end) contains t key changes. For example, the list $\{1, 2, 2, 2\}$ would be represented by $\{s=1, e=2, t=1\}$ and $\{3, 4, 4, 7\}$ would be represented by $\{s=3, e=7, t=2\}$.

The associative function is $f(\{s_1, e_1, t_1\}, \{s_2, e_2, t_2\}) \rightarrow \{s_1, e_2, t_1+t_2+(e_1==s_2 ?0:1)\}$, and it assumes string 1 is immediately to the left of string 2. In words, f creates a data structure for a string starting at the beginning of string 1 and ending at the end of string 2. All index changes in the two input strings will appear in the output string, but, in addition, if the keys are different on the sides of place where the strings join, there will be one additional change. So for example, $f(\{s_1=1, e_1=2, t_1=1\}, \{s_2=3, e_2=7, t_2=2\}) \rightarrow \{s=1, e=7, t=4\}$, indicating that the combined string has indices ranging from 1 to 7 with four index changes. Each record n initializes the reduction data to $\{k_n, k_n, 0\}$.

Parallel Suffix (4c): In parallel with 4a and 4b, the network uses parallel suffix on the same data structure as in 4b to begin creating a destination address, n. However, each record only applies the operator to values received from a higher numbered record. For record N this will compute a three-field structure $\{s_n, e_n, t_n\}$ where the fields have the following individual meanings:

The term $s_n$ is the key in record n+1. In other words, the suffix algorithm obtains a value from the next subsequent record. The term $e_n$ is the last index in the combined buffer (which is not used). The term $t_n$ is the number of key changes from the next record to the end of the combined buffer. However, one could also say $t_n+1$ is the number of distinct indices from record n+1 to the end of the buffer.

Address Determination (5): One can now perform local calculations to find the destination address of each record. Record n has local information on its key $k_n$ and the key in the next record $s_n$. This record will be deleted if these two keys are the same, so local variable is set as $D_n=(k_n==s_n?1:0)$, which is 1 if this record is to be deleted.

First compute the number of records $t'_n$ to be deleted from record n+1 to the end of the 2K-length buffer. The number of records to be kept plus the number to be deleted will be 2K-n, all that are left. Therefore $2K-n-t_n-D_n=t'_n$.

Now determine how to compute the address of each record in the final list. It is known that the non-deleted records will take positions 0, 1, ... T−1 as shown in column AR of FIG. 11 and FIG. 12. Since T=t+1, the positions are actually 0, 1, ... t, where t is the result of the reduction. One can set the address for non-deleted records to $t-(t_n+1)=t-t_n-1$.

Deleted records will take positions 2K−1, 2K−2 ... T, as shown in column AD of the figure, so one can set the address for deleted records to $t-t'_n-1$.

The diagrams show preparation for the data distribution. Records are put in the form {addr, key, value}. The diagram shows the indices of records to be deleted as 999, where 999 is just a flag.

Redistribution (6): 6. The records are distributed to positions corresponding to their index. Note that the list has a bitonic form. The indices increased from the top to the first 999 flag. While the 999 flags do not decrease, tracking them back to their position in step 5 shows that the values are effectively decreasing.

Based on the discussion above, a Superstrider step is as follows, using some timing figures for illustration only: The DRAM reads row of memory into the selected row buffer, yielding up to K records in sorted order. Assume the DRAM is operating on a 40 ns (nanosecond) cycle.

The selected row buffer's records are merged with up to K records in sorted order in the accumulator, yielding up to 2K sorted records in the selected row buffer and accumulator. Assume the quasi-serial sort that takes 15 clock cycles at 0.5 ns per cycle, for a total of 7.5 ns.

The scalar logic makes decisions about which records get stored back in memory versus left in the accumulator and what row to access next. This logic may cause data transfer between the accumulator and selected row buffer. Based on the timing information above, there is a 65 clock cycle budget for this step.

The selected row buffer is written back to memory. Both the memory row and the accumulator are left in sorted order for their next use.

FIG. 13 illustrates example control fields for a sorting computational memory, in accordance with an illustrative embodiment. FIG. 13 aids in understanding data layout in Superstrider, as shown in FIG. 5 through FIG. 8.

The display format used in FIG. 5 and throughout this document permutes the rows from the DRAM physical to show data layout more effectively. Each row's physical address appears in the leftmost field in the diagram, allowing the tree-structure to be visible without loss of information. Each row begins with some control fields, identified in table 1300 of FIG. 13. The first column contains the memory row's address before a colon, with the third (fourth) column starting with the row address of the left or lesser (right or greater-or-equal) subtree. A subtree address of zero indicated no such subtree exists. Address zero can never be a subtree because the root of Superstrider's overall tree is defined to be at address zero.

FIG. 6 shows the tree structure corresponding to the example data in FIG. 5. The tree's root is DRAM row 0, in the middle. Each row references up to two subtrees by index, with the tree structure annotated in FIG. 6. The hashed cells have keys in ascending order when read left-to-right, top-to-bottom. This result is due to the simulator printing out the tree in breadth-first order.

The tree has an unusual structure, leading to multiple forms. Each node contains a key in the second column called the pivot, but it is slightly different from the pivots commonly found in the algorithmic literature for sorting. All keys in the left (right) subtree are less than (greater than or equal to) the pivot. However, there are also up to K records in the node itself. Records whose key is less than the pivot are shown as a first hash type, such as, for example, at boxes 512, and the others shown as a second hash type, for example, at box 514, and the records are always sorted.

The constraints above define the multiset form, because it allows a key to appear more than once. Any key could be found in a leaf node and any ancestor node up to the root, or in any combination of these nodes. This ambiguity is useful for computational efficiency, but the ambiguity must be removed at some point.

One additional constraint forces the tree to contain a set of keys, using the strict definition of a set which disallows duplicate elements. Set form requires that all keys in the left (right) subtree are less (greater) than all keys in the entire row (rather than just the pivot). The normalize algorithm described later converts a Superstrider in multiset form to one in set form. Set also defines the standard form by adding the constraint that all rows except the last have exactly K records. The standard form is unique.

Figure 15:
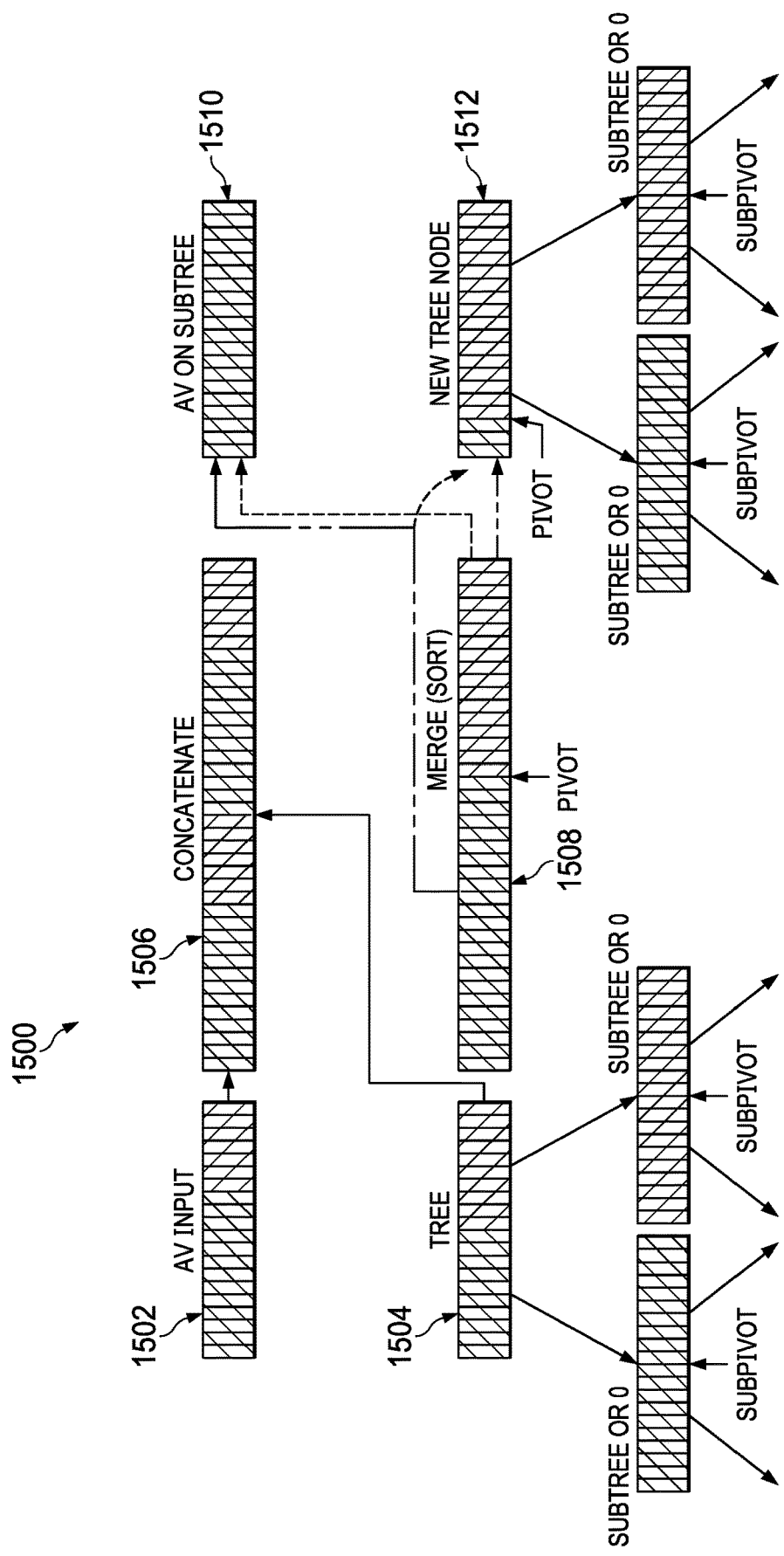
FIG. 15 illustrates a step in the Add vector, or Av, function, which inserts up to K records in parallel, in accordance with an illustrative embodiment.

FIG. 14 illustrates the Superstrider tree structure, in accordance with an illustrative embodiment. The Superstrider tree structure shown in FIG. 14 is analogous to abstract representation 102 shown in FIG. 1. FIG. 14 illustrates a definition of a Superstrider tree, which includes left and right subtrees and up to K data records per tree node. FIG. 15 illustrates a step in the Add vector, or Av, function, which inserts up to K records in parallel, in accordance with an illustrative embodiment. This operation is analogous to abstract representation 104 of FIG. 1. FIG. 15 illustrates the Superstrider transform, which is a step that, when repeated, inserts K records to a tree with full parallelism. FIG. 14 and FIG. 15 should be considered together.

FIG. 14 illustrates the Superstrider transform, the central step in a novel parallel algorithm for sparse matrix accumulation discussed in this document. In particular, FIG. 14 illustrates Superstrider tree structure 1400, specifically a tree where each node contains up to K records as well as two subtrees. The convention in the algorithmic literature is that each tree node, such as tree node 1402, contains a key called the pivot, with keys in the left subtree less than the pivot, shown at area 1404, and keys in the right subtree greater than or equal, shown at area 1406. The unique feature is that the tree node itself contains up to K keys where keys less than the pivot are shown in area 1408 and the keys greater than or equal to the pivot are shown in area 1410. While this tree structure may contain the same key at different levels, it is still possible to search for a key in a logarithmic number of steps by examining tree nodes on a single path from root to leaf, using the pivots to guide the path.

FIG. 15 illustrates a step in the Add vector, or Av, function, which inserts up to K records in parallel. Step 1500 starts at position 1502 with up to K records that may be destined to go anywhere in the tree, so the records are represented by different hashing patterns in FIG. 15. Tree insertion algorithms in textbooks would divide the input list into two shorter lists, inserting the shorter lists into the left and right subtrees sequentially. Dividing the list destroys the parallelism and makes the algorithm inefficient. In contrast, the illustrative embodiments provide for a transform that retains the parallelism.

The Superstrider transform concatenates the input at position 1502 and the contents of the tree node at tree 1504, sorting or merging the resulting list of up to 2K records (position 1506) to a sorted list (position 1508), with the diagram showing the placement of the example records by hash pattern shown in FIG. 15.

In the sorted list at position 1508, keys on the left are less than the pivot and those on the right are greater than or equal to the pivot. Thus, position 1508 is called the pivot position.

The list at position 1508 is divided into two lists: position 1510 and position 1512, each of length up to K. The pivot position is on the bottom list in this example, but it could be on the top list as well. However, the algorithm swaps the lists if necessary to assure the pivot ends up on the bottom. Then the new tree node at position 1512 is stored back in memory, which preserves tree structure because Superstrider's definition of a tree allows the keys to have any value. Now the K-length list of new records at position 1510 is applied to the subtrees, which was where the standard algorithm lost parallelism.

However, as a novel facet of Superstrider, one can see that all the Av elements in position 1510 are destined for the same subtree, because the transform assured the pivot position was on the bottom at position 1512. Thus, Superstrider will always have a split of up to K insertions on one subtree and zero on the other. The zero-record insertion is ignored, and Superstrider recurses on just one subtree. This process is thus analogous to abstract representation 104 of FIG. 1, where two glasses of mixed Champagne types (shown in the checkered pattern in FIG. 1) can always be divided into a full glass of either a first Champagne type shown at left path 105 or a second Champagne type shown at right path 106 of FIG. 1, plus one glass of mixed Champagne. Thus, Superstrider maintains parallelism and succeeds in inserting K records by traversing just one route from the root to a leaf. In analogy to Champagne tower 100 of FIG. 1, the Superstrider transform both distributes material, Champagne or records, and buffers that material along the way via a tree of storage structures, Champagne glasses or DRAM rows.

Through application-specific handling of duplicate keys, Superstrider can support a number of important applications. Superstrider assumes all input records, such as at position 1502, will be in sorted order and have no duplicate keys. If merging at position 1504 identifies duplicate keys, called collisions, and adds or otherwise combines the values, then all data stored in a memory row will also be in sorted order and with no duplicate keys. This facet of Superstrider is a simplification that allows merging in position 1504, rather than sorting. However, this facet of Superstrider will lead to insertion and memory rows with less than K records, and it is still possible for Superstrider's tree to have duplicated keys at different levels of the tree.

Much of the subject matter following FIG. 15 describes a processor-in-memory architecture that implements the Superstrider transform as a primitive operation. Proper support of collisions exposes Superstrider's architecture to data structures and algebraic forms of keys and values, complicating implementation, but allowing the Superstrider to support both floating point numerical supercomputing and graph algorithms.

Figure 16:
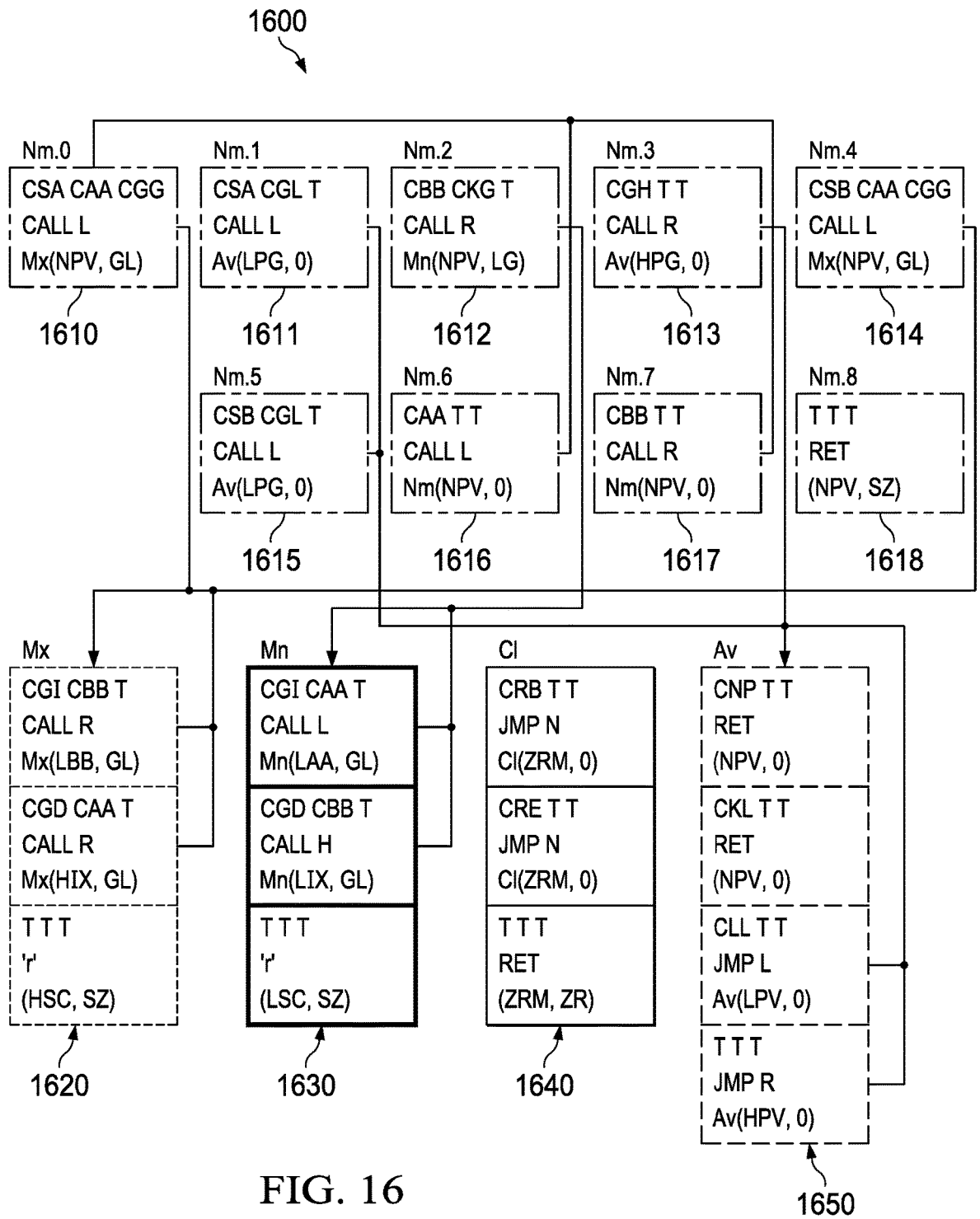
FIG. 16 shows the program from which the Addvec (Av) commands from FIG. 8 were extracted, yet augmented to include ancillary functions that set up the system as well as format the output for subsequent use, in accordance with an illustrative embodiment.

FIG. 16 shows the program from which the Addvec (Av) commands from FIG. 8 were extracted, yet augmented to include ancillary functions that setup the system as well as format the output for subsequent use, in accordance with an illustrative embodiment. Thus, FIG. 16 illustrates Superstrider's generality.

FIG. 16 defines a total of five functions, each indicated by one the following two-letter abbreviations:

Cl, Clear memory, clear and put all memory rows in a "freelist."

Av, Add vector, illustrated in FIG. 8.

Mx, Maximum, or remove the specified number of the largest records in a subtree.

Mn, Minimum, or remove the specified number of the smallest records in a subtree.

Nm, Normalize, or convert data in memory to a standard form.

The clear function (Cl) 1640 runs on startup to clear memory and set up a list of available memory rows for allocation. The conditions Cx, Cy, and Cz from FIG. 8 on each command of 1640 are drawn from the set below, so CRB, or RowNum=0 is true only for the first row. CRE, or RowNum<DRAM.size−1 identifies all other rows except the last. Since T is always true, the last command executes only when the others do not, which is just for the last row in memory.

T, TRUE.
CAA, IsA, left subtree exists.
CBB, IsB, right subtree exists.
CSA, First=L, strategy is left side first.
CSB, First=R, strategy is right side first.
CGI, Goal>InpSiz, more requested than was received.
CGD, Goal>DOp[LIX], more request than prepared to deliver with LIX data path op.
CGL, DOp[LPG]>0, LPG data path op will produce some records.
CGH, DOp[HPG]>0, HPG data path op will produce some records.
CGG, Goal>0, request greater than zero.
CKG, K-Goal>0, request less than K.
CRE, RowNum<DRAM.size−1, not the last row of DRAM.
CRB, RowNum=0, first row of DRAM.
CNP, Pivot=−1, pivot is not set.
CKL, K≥LT+GE, records fit in buffer.
CLL, LT≥GE, more records less than pivot.

The middle command of 1640 includes two fields as explained in FIG. 8. The clear function (Cl) steps through memory one row at a time, so the commands are JMP N, meaning to go (JMP) to the next (N) memory row. The bottom row specifies the function to execute on the next cycle and the data path control. The next function is Cl to continue executing the clear function, except for the bottom command in 1640 which returns because the clear function has completed. The final field is ZRM, a command drawn from the set below, and where ZRM means to zero memory.

Definitions of parallel data path operations ($f_{par}$):
NOP, −1, no operation.
LPV, up to K below-pivot records to low side.
LPG, below-pivot records beyond the goal to low side.
LIX, max and min part 2.
LAA, up to num inputs to low side.
LSC, smallest records to caller.
HPV, up to K above-pivot records to high side.
HPG, above-pivot records beyond the goal to high side.
HIX, max and min part 2.
LBB, up to num inputs to high side.
HSC, largest records to caller.
NPV, no data operation; assure pivot set.
ZRM, zero memory.

Thus, the three Cl commands 1640 sequentially step through every row of memory, setting it to zero.

Using the same abbreviations for conditions and actions, the maximum (Mx) function 1620 can return 1 . . . K records with the largest keys from the subtree rooted at the current memory row. However, for this paragraph assume Mx has been asked to return the 10 largest records. The first command 1620 calls the Mx function recursively on the right (R) subtree, asking for 10 records. However, this will only occur if the CBB condition is true, indicating that the right subtree exists. Furthermore, if the right subtree contains less than 10 records, say 8 records, the function can return only 8 records, deleting the entire right subtree. In this case, middle command of 1620 executes, recursively calling Mx on the left (L) subtree to request an additional 2 records. Following the second return, 1620 returns, in this case, 10 records to the caller. The HSC command in the third command of 1620 specifies the records to be returned as "largest records to caller."

The minimum command 1630 operates similarly to maximum, but reversing the roles of maximum versus minimum and left versus right.

The normalization function 1610 fills all memory rows with exactly K records, except the last, using 9 sequential commands drawn horizontally, albeit in two rows due to page width limitations. While Addvec adds records in groups of K, compression causes memory rows to shrink. Leaving the tree with partially filled rows would waste memory, so normalization (Nm) removes or adds a few records from the tree and its subtrees with the ultimate effect that all the rows are either entirely full or are deleted and returned to the freelist—except the very last row.

For example, say K=10 and the left subtree has 1,206 records. To have all memory rows completely full requires the number of records in the tree or subtree to be a multiple of K, or 10. This can be accomplished in this example by removing six records from the subtree, yielding 1,200, or adding four, yielding 1,210. Commands 1610 and 1611 remove, by calling maximum, and add, by calling Addvec the proper number records from the left subtree to assure it contains a multiple of K records. Commands 1612 and 1613 remove or add records from the right subtree such that the current row is full. The processing of the left and right subtrees can overflow the memory row between the operations, but it has been determined that reversing the order of left and right subtree processing avoids this overflow. Therefore commands 1614 and 1615 perform the same operation on the left subtree as commands 1610 and 1611 previously mentioned. Conditions codes cause just one of the pairs of commands 1610 and 1611 versus commands 1614 and 1615 to execute, effectively reversing the left-right order. The current row has been adjusted at this point, so commands 1616 and 1617 recursively call the normalize function on the left and right subtrees respectively, followed by subroutine return 1618.

The discussion above only assures that the left subtree and the current row have a multiple of K records, so we include a way to propagate this assurance to all rows (except the last). Commands 1606 and 1607 recursively call the normalization function on the left and right subtrees. One will realize that every node in a tree is a left subtree of some node, except the rightmost node the entire tree and the root. However, the root is handled directly. It therefore follows that every row except the last one will be adjusted to have exactly K records.

Figure 20:
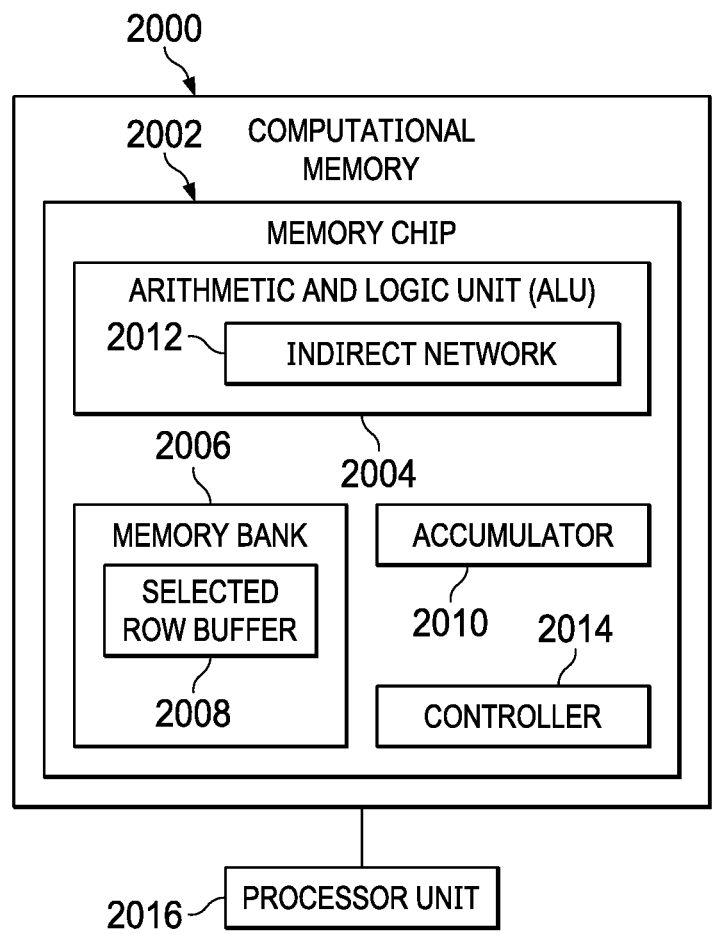
FIG. 20 illustrates a computational memory having an architecture, in accordance with an illustrative embodiment.

The test driver program for the Superstrider demonstration system runs on microprocessor 402 of FIG. 4 and creates performance numbers shown in FIG. 20. The driver has the following steps (1) it calls clear (Cl) to zero memory, (2) it calls Addvec (Av) many times with K records per call, (3) it calls the normalization function (Nm), (4) it verifies correctness against a "ground truth" and prints out statistics on the timing of steps (2) and (3).

A wide variety of functions can be created using the commands on the left of FIG. 8 as programming primitives and creating a control block in the style of FIG. 16. Customizing the data types and arithmetic semirings in the network further generalizes Superstrider.

Figure 17:
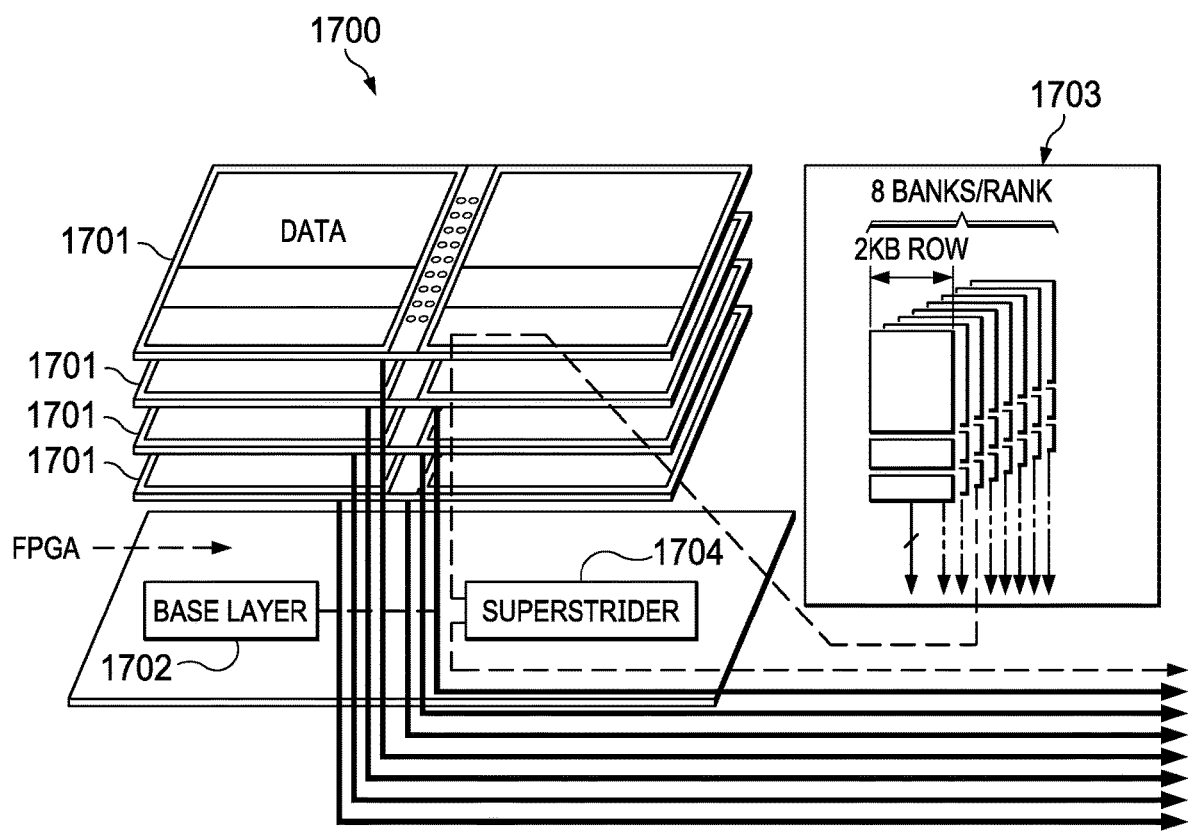
FIG. 17 illustrates physical placement of a sorting computational memory in a traditional memory bank for a computer, in accordance with an illustrative embodiment.

FIG. 17 illustrates physical placement of a sorting computational memory in a high bandwidth memory module for a computer, in accordance with an illustrative embodiment. Memory module 1700 comprises a stack of four functionally identical dynamic random access memory (DRAM) chips 1701, each divided into two halves called ranks, on a base layer 1702. This is equivalent to memory layer 208 in FIG. 2. Each rank, detailed in box 1703, contains eight banks, with one bank at a time connecting to a channel. The base layer 1702 may be a field programmable gate array (FPGA) or an application specific integrated circuit (ASIC), and equivalent to logic layer 204 in FIG. 2. The base layer may include one Superstrider accelerator per channel, one illustrated as 1704, as described above with respect to FIG. 1 through FIG. 14, except that a rank at box 1703 would be the DRAM bank 502 as shown in FIG. 5. The architecture of one Superstrider accelerator is illustrated in top layer 202 of FIG. 2, in an abbreviated form.

Figure 18:
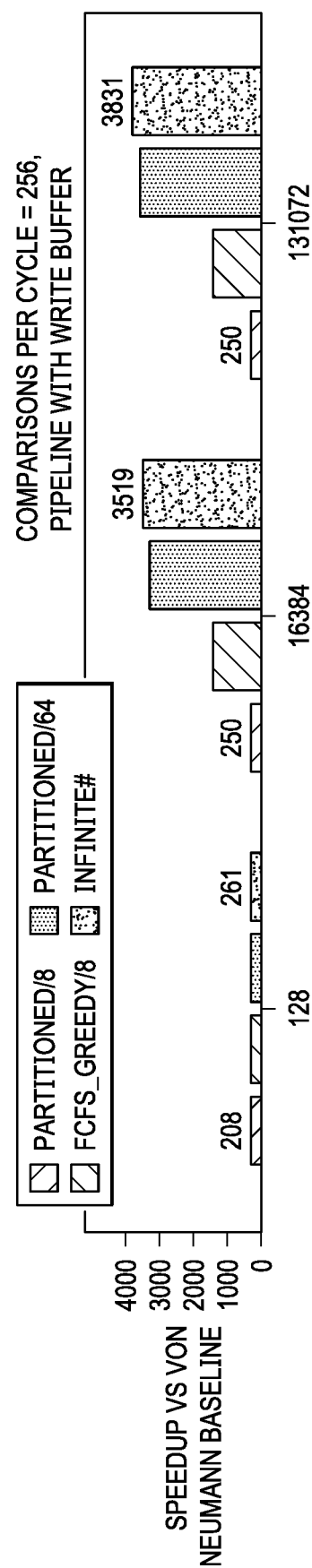
FIG. 18 illustrates of table showing the performance enhancements provided by Superstrider versus a von Neumann computer alone, in accordance with an illustrative embodiment.

FIG. 18 is a table showing the performance enhancements provided by Superstrider versus a von Neumann computer alone, in accordance with an illustrative embodiment. The performance enhancements shown in FIG. 18 are startlingly large, improving speed by a factor of at least several hundred, though as high as a factor of 3831. Thus, the illustrative embodiments provide unexpectedly good results in terms of increasing the processing speed of a computer, at least with respect to certain types of algorithms.

Upon increasing the number of comparators per merge network to 256, significant additional improvement is seen when the interface width and the capability of the function unit pool are increased, as shown in FIG. 18. The larger merge network is now able to better keep up with data being delivered due to the increased interface width, rendering improved marginal utility of more powerful function unit pool configurations as well. Further increasing the size of the merge network to support 2,048 comparisons per cycle realizes very modest improvements when increasing interface width to 16,384 bits and larger.

Figure 19:
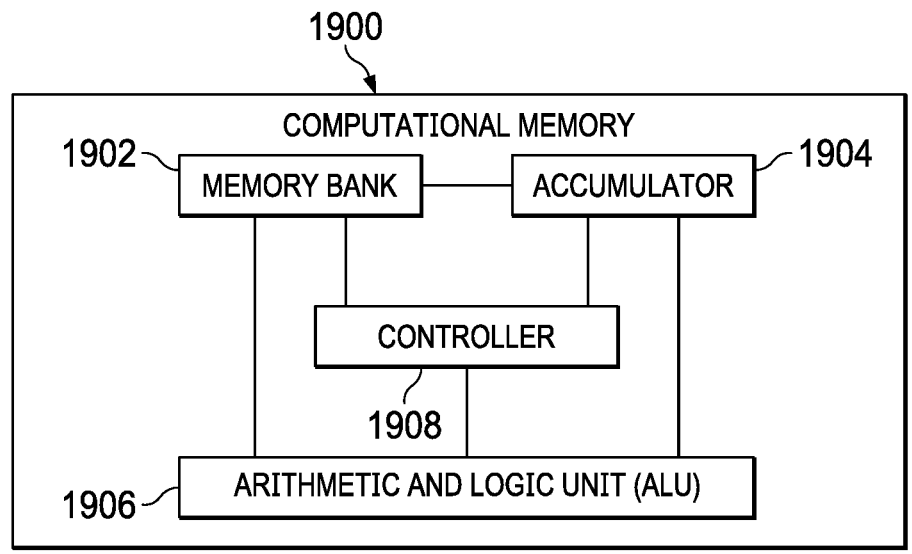
FIG. 19 illustrates a computational memory for a computer, in accordance with an illustrative embodiment.

FIG. 19 illustrates a computational memory for a computer, in accordance with an illustrative embodiment. Computational memory 1900 is an example of a hardware implementation of Superstrider, as described above with respect to FIG. 1 through FIG. 18.

Computational memory 1900 includes memory bank 1902. Memory bank 1902 has a selected-row buffer and is configured to store records up to a number, K.

Computational memory 1900 also includes accumulator 1904 connected to the memory bank. Accumulator 1904 is configured to store up to K records.

Computational memory 1900 also includes arithmetic and logic unit 1906 (ALU) connected to the accumulator and to the selected row buffer of the memory bank. The ALU 1906 has an indirect network of 2K ports for reading and writing records in the memory bank and the accumulator. The ALU 1906 is further physically configured to operate as a sorting network.

Computational memory 1900 also includes controller 1908 connected to the memory bank 1902, ALU 1906, and the accumulator 1904. Controller 1908 is hardware configured to direct operation of ALU 1906.

The illustrative embodiments described with respect to FIG. 19 may be varied. For example, in an illustrative embodiment, each record contains a corresponding key and a corresponding value. The indirect network of the ALU is configured to sort records in the accumulator by key and combine records with the same key, thereby creating unique records, and then write the unique records back into the memory bank. In this manner, fewer than K records are ultimately stored in the memory bank.

This latter example may be extended. For example, in an illustrative embodiment, ALU 1906 is further configured to merge records using a bitonic merge operation. In another example, controller 1908 is further configured to, prior to writing back merged records, determine which records are written back into the memory bank and which records will remain in the accumulator.

In yet another illustrative embodiment, one network input of the indirect network connects to each record in the ALU. In this case, outputs of the indirect network wrap around to inputs of the memory bank.

In still another illustrative embodiment, the computational memory is configured to receive and process an algorithm offloaded from a different processor unit. Thus, the illustrative embodiments are not necessarily limited to these examples.

FIG. 20 illustrates a computational memory having an architecture, in accordance with an illustrative embodiment. Computational memory 2000 is an alternative embodiment of computational memory 1900 of FIG. 19. Computational memory 2000 is an example of Superstrider, as described above with respect to FIG. 1 through FIG. 18.

Computational memory includes memory chip 2002. Memory chip 2002 is configured to translate memory addresses. Memory chip 2002 is configured to assist processor unit 2016 by altering addresses in requests based on application-specific storage patterns. Memory chip 2002 is further configured to offload subroutines executed by processor unit 2016 onto the memory chip using data movement and processing capabilities internal to memory chip 2002. Memory chip 2002 has arithmetic and logic unit 2004 (ALU) that is configured to operate as a sorting network.

Computational memory 2000 may be varied. For example, computational memory chip 2002 may further include memory bank 2006 with selected row buffer 2008. Computational memory chip 2002 may also include accumulator 2010. Computational memory chip 2002 may also include indirect network 2012 in ALU 2004.

Indirect network 2012 may be configured to sort up to K records in the accumulator and selected row buffer, compressing records with the same key. In this manner, unique records are created, and then written back into memory bank 2006. In this manner, K or fewer records are ultimately stored in memory bank 2006.

Continuing this example, ALU 2004 may be further configured to sort records using a bitonic merge operation. In yet another illustrative embodiment, memory chip 2002 may further include controller 2014. Controller 2014 may be configured to, prior to writing back merged records, determine which records are written back into memory bank 2006 and which records will remain in accumulator 2010.

In still another illustrative embodiment, one network input of indirect network 2012 connects to each record in the ALU 2004. In a related example, outputs of indirect network 2012 wrap around to inputs of memory bank 2006.

In a different example, computational memory 2000 is configured to receive and process an algorithm offloaded from a different processor unit, such as processor unit 2016.

Still other variations are possible. Therefore, the illustrative embodiments described with respect to FIG. 20 do not necessarily limit the claimed inventions.

Figure 21:
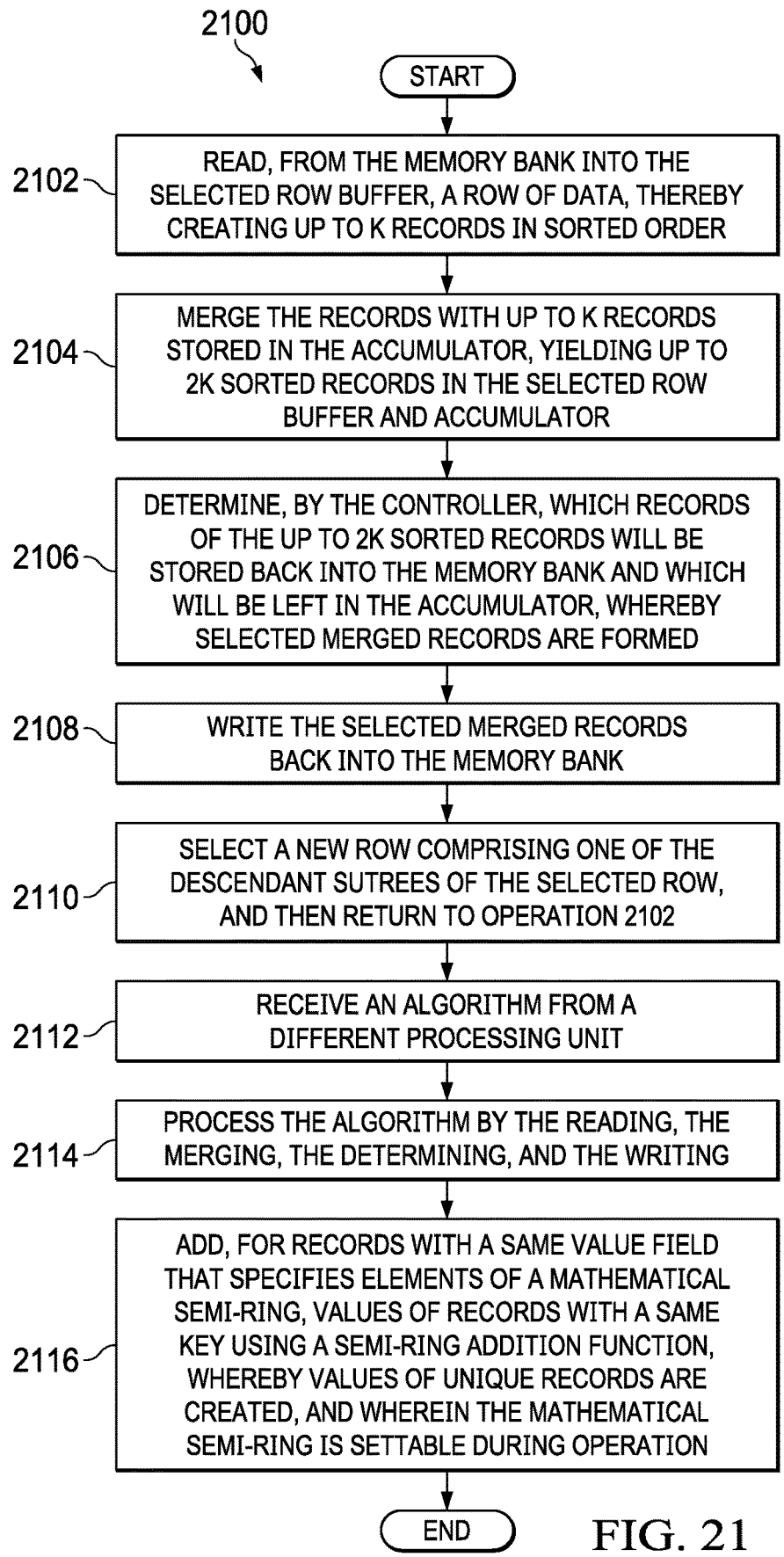
FIG. 21 illustrates a method of sorting and merging data in a computational memory, in accordance with an illustrative embodiment.

FIG. 21 illustrates a method of sorting and merging data in a computational memory, in accordance with an illustrative embodiment. FIG. 21 is a method that may be implemented using Superstrider, as described with respect to FIG. 1 through FIG. 21.

Method 2100 may be characterized as a method of sorting and merging data in a computational memory comprising a memory bank having a selected row buffer and being configured to store records up to a number, K; an accumulator connected to the memory bank, the accumulator configured to store up to K records; an arithmetic and logic unit (ALU) connected to the accumulator and to the selected row buffer of the memory bank, the ALU having an indirect network of 2K ports for reading and writing records in the memory bank and the accumulator, and the ALU further physically configured to operate as a sorting network; and a controller connected to the memory bank, the ALU, and the accumulator, the controller being hardware configured to direct operation of the ALU. Method 2100 may be a repetition of the following group of steps until all new rows are processed. The details of method 2100 are now presented.

Method 2100 includes reading, from the memory bank into the selected row buffer, a row of data, thereby creating up to K records in sorted order (operation 2102). Method 2100 also includes merging the records with up to K records stored in the accumulator, yielding up to 2K sorted records in the selected row buffer and accumulator (operation 2104).

Method 2100 also includes determining, by the controller, which records of the up to 2K sorted records will be stored back into the memory bank and which will be left in the accumulator, whereby selected merged records are formed (operation 2106). Method 2100 also includes writing the selected merged records back into the memory bank (operation 2108). In one illustrative embodiment, the method may terminate thereafter (that is method 2100 may optionally skip one or more of operation 2110, operation 2112, operation 2114, and operation 2116).

Method 2100 may be varied. In an illustrative embodiment, method 2100 may include selecting a new row comprising one of the descendant subtrees of the selected row, and then returning to operation 2102 (operation 2110). Again, once all new rows have been processed accordingly, in one illustrative embodiment, method 2100 may terminate. In another illustrative embodiment, records with the same key are compressed such that fewer than K records are in the memory bank after writing.

In an extended illustrative embodiment, method 2100 may also include receiving an algorithm from a different processing unit (operation 2112); and processing the algorithm by the reading, the merging, the determining, and the writing (operation 2114). In this illustrative embodiment, the algorithm comprises one of sparse matrix multiplication and a graph algorithm.

Method 2100 contemplates still additional operations. For example, method 2100 also contemplates adding, for records with a same value field that specifies elements of a mathematical semiring, values of records with a same key using a semiring addition function, whereby values of unique records are created, and wherein the mathematical semiring is settable during operation (operation 2116). In one illustrative embodiment, the method may terminate thereafter.

Still further variations are possible. For example, in FIG. 7 (in the box labeled Normal DRAM), the mathematical semiring is set to the minimum function and addition, a common semiring for graph algorithms. Thus, the illustrative embodiments described herein do not necessarily limit the claimed inventions.

Figure 22:
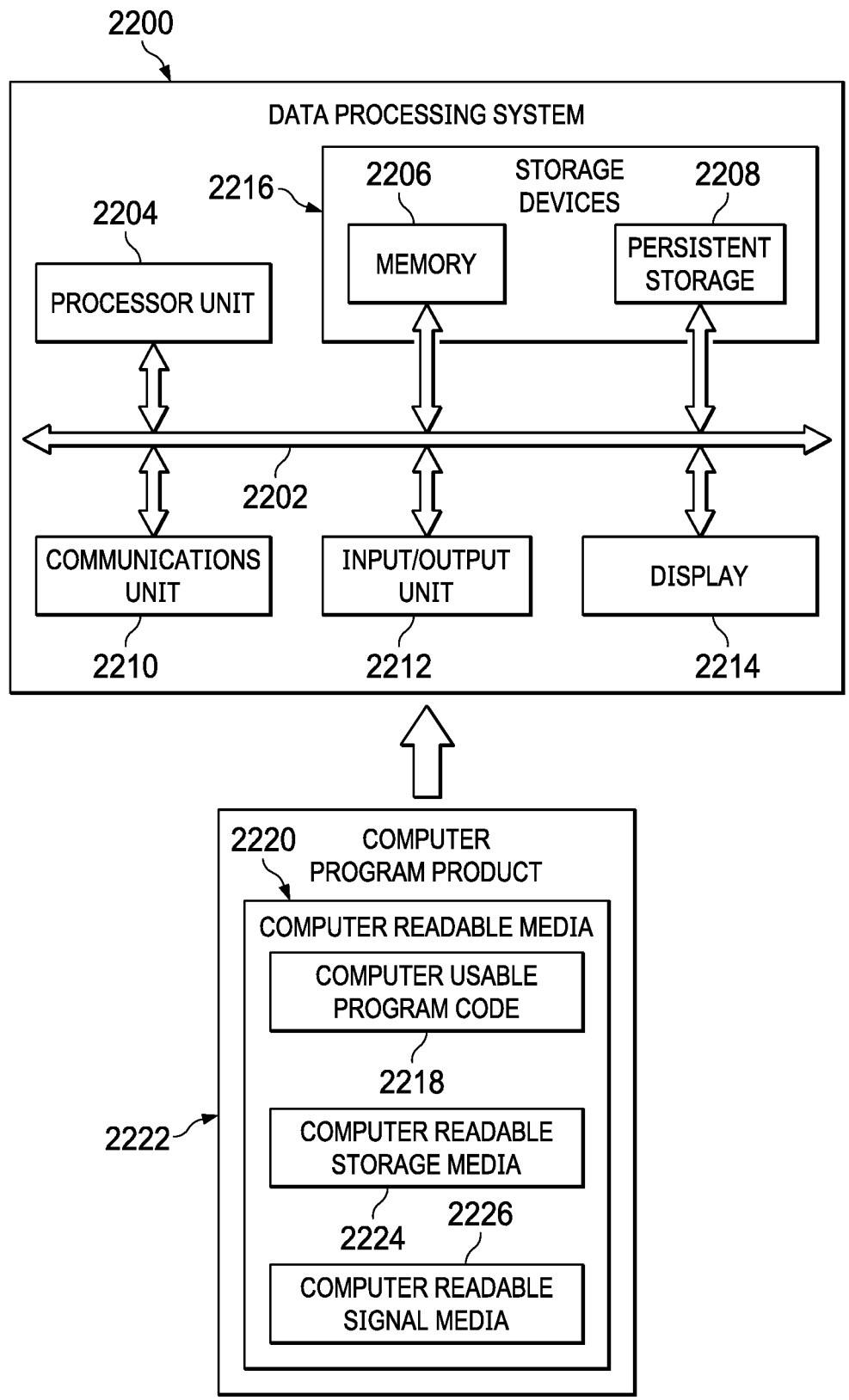
FIG. 22 illustrates a data processing system in which the illustrative embodiments may be installed, in accordance with an illustrative embodiment.

Turning now to FIG. 22, an illustration of a data processing system is depicted in accordance with an illustrative embodiment. Data processing system 2200 in FIG. 22 is an example of a data processing system that may take advantage of a Superstrider architecture, as described above with respect to FIG. 1 through FIG. 21.

In this illustrative example, data processing system 2200 includes communications fabric 2202, which provides communications between processor unit 2204, memory 2206, persistent storage 2208, communications unit 2210, input/output (I/O) unit 2212, and display 2214. Persistent storage 2208 may be a Superstrider memory. Processor unit 2204 serves to execute instructions for software that may be loaded into memory 2206.

A number, as used herein with reference to an item, means one or more items. Further, processor unit 2204 may be implemented using a number of heterogeneous processor systems in which a main processor is present with secondary processors on a single chip. As another illustrative example, processor unit 2204 may be a symmetric multi-processor system containing multiple processors of the same type.

Memory 2206 and persistent storage 2208 are examples of storage devices 2216. Memory 2206 may also be a Superstrider memory. A storage device is any piece of hardware that is capable of storing information, such as, for example, without limitation, data, program code in functional form, and/or other suitable information either on a temporary basis and/or a permanent basis. Storage devices 2216 may also be referred to as computer readable storage devices in these examples. Memory 2206, in these examples, may be, for example, a random access memory or any other suitable volatile or non-volatile storage device. Persistent storage 2208 may take various forms, depending on the particular implementation.

For example, persistent storage 2208 may contain one or more components or devices. For example, persistent storage 2208 may be a hard drive, a flash memory, a rewritable optical disk, a rewritable magnetic tape, or some combination of the above. The media used by persistent storage 2208 also may be removable. For example, a removable hard drive may be used for persistent storage 2208.

Communications unit 2210, in these examples, provides for communications with other data processing systems or devices. In these examples, communications unit 2210 is a network interface card. Communications unit 2210 may provide communications through the use of either or both physical and wireless communications links.

Input/output (I/O) unit 2212 allows for input and output of data with other devices that may be connected to data processing system 2200. For example, input/output (I/O) unit 2212 may provide a connection for user input through a keyboard, a mouse, and/or some other suitable input device. Further, input/output (I/O) unit 2212 may send output to a printer. Display 2214 provides a mechanism to display information to a user.

Instructions for the operating system, applications, and/or programs may be located in storage devices 2216, which are in communication with processor unit 2204 through communications fabric 2202. In these illustrative examples, the instructions are in a functional form on persistent storage 2208. These instructions may be loaded into memory 2206 for execution by processor unit 2204. The processes of the different embodiments may be performed by processor unit 2204 using computer implemented instructions, which may be located in a memory, such as memory 2206.

These instructions are referred to as program code, computer usable program code, or computer readable program code that may be read and executed by a processor in processor unit 2204. The program code in the different embodiments may be embodied on different physical or computer readable storage media, such as memory 2206 or persistent storage 2208.

Program code 2218 is located in a functional form on computer readable media 2220 that is selectively removable and may be loaded onto or transferred to data processing system 2200 for execution by processor unit 2204. Program code 2218 and computer readable media 2220 form computer program product 2222 in these examples. In one example, computer readable media 2220 may be computer readable storage media 2224 or computer readable signal media 2226. Computer readable storage media 2224 may include, for example, an optical or magnetic disk that is inserted or placed into a drive or other device that is part of persistent storage 2208 for transfer onto a storage device, such as a hard drive, that is part of persistent storage 2208. Computer readable storage media 2224 also may take the form of a persistent storage, such as a hard drive, a thumb drive, or a flash memory, that is connected to data processing system 2200. In some instances, computer readable storage media 2224 may not be removable from data processing system 2200.

Alternatively, program code 2218 may be transferred to data processing system 2200 using computer readable signal media 2226. Computer readable signal media 2226 may be, for example, a propagated data signal containing program code 2218. For example, computer readable signal media 2226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 2218 may be downloaded over a network to persistent storage 2208 from another device or data processing system through computer readable signal media 2226 for use within data processing system 2200. For instance, program code stored in a computer readable storage medium in a server data processing system may be downloaded over a network from the server to data processing system 2200. The data processing system providing program code 2218 may be a server computer, a client computer, or some other device capable of storing and transmitting program code 2218.

The different components illustrated for data processing system 2200 are not meant to provide architectural limitations to the manner in which different embodiments may be implemented. The different illustrative embodiments may be implemented in a data processing system including components in addition to or in place of those illustrated for data processing system 2200. Other components shown in FIG. 22 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 2204 may take the form of a hardware unit that has circuits that are manufactured or configured for a particular use. This type of hardware may perform operations without needing program code to be loaded into a memory from a storage device to be configured to perform the operations.

For example, when processor unit 2204 takes the form of a hardware unit, processor unit 2204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 2218 may be omitted because the processes for the different embodiments are implemented in a hardware unit.

In still another illustrative example, processor unit 2204 may be implemented using a combination of processors found in computers and hardware units. Processor unit 2204 may have a number of hardware units and a number of processors that are configured to run program code 2218. With this depicted example, some of the processes may be implemented in the number of hardware units, while other processes may be implemented in the number of processors.

As another example, a storage device in data processing system 2200 is any hardware apparatus that may store data. Memory 2206, persistent storage 2208, and computer readable media 2220 are examples of storage devices in a tangible form.

In another example, a bus system may be used to implement communications fabric 2202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 2206, or a cache, such as found in an interface and memory controller hub that may be present in communications fabric 2202.

Furthermore, the algorithms described above with respect to FIG. 1 through FIG. 21 can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, an optical disk, and the Superstrider memory described above (meaning that Superstrider can act as both processor and memory). Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computational device for a computer, the computational device comprising:
    a memory bank having a selected-row buffer and being configured to store records up to a number, K;
    an accumulator connected to the memory bank, the accumulator configured to store up to K records;
    an arithmetic and logic unit (ALU) connected to the accumulator and to the selected row buffer of the memory bank, the ALU having an indirect network of 2K ports for reading and writing records in the memory bank and the accumulator, and the ALU further physically configured to operate as a sorting network, wherein the ALU comprises:
        a first number of input lines connected to the selected row buffer;
        a second number, equal to the first number, of input lines connected to the accumulator;
        a number of comparison modules configured to compare records in the memory bank and accumulator as the records pass along the input lines, wherein every input line is connected to every other input line by a separate comparison module, and wherein the comparison modules swap records between input lines as needed to place the records in a predefined order; and
    a controller connected to the memory bank, the ALU, and the accumulator, the controller being hardware configured to direct operation of the ALU;
    wherein the computational device is a computational memory.

2. The computational device of claim 1, wherein each record contains a corresponding key and a corresponding value, and wherein the indirect network of the ALU is configured to sort records in the accumulator by key and combine records with the same key, thereby creating unique records, and then write the unique records back into the memory bank, whereby fewer than K records are ultimately stored in the memory bank.

3. The computational device of claim 2, wherein the ALU is further configured to merge records using a bitonic merge operation.

4. The computational device of claim 2, wherein the controller is further configured to, prior to writing back merged records, determine which records are written back into the memory bank and which records will remain in the accumulator.

5. The computational device of claim 1, wherein one network input of the indirect network connects to each record in the ALU.

6. The computational device of claim 5, wherein outputs of the indirect network wraps around to inputs of the memory bank.

7. The computational device of claim 1, wherein the computational memory is configured to receive and process an algorithm offloaded from a different processor unit.

8. A computational device having an architecture comprising:
    a memory chip configured to translate memory addresses, wherein the memory chip is configured to assist a processor by altering addresses in requests based on application-specific storage patterns, wherein the memory chip is further configured to offload subroutines executed by the processor onto the memory chip using data movement and processing capabilities internal to the memory chip; and
    an arithmetic and logic (ALU) unit in the memory chip, wherein the ALU is configured to operate as a sorting network, wherein the ALU comprises:
        a number of input lines configured to carry records stored in the memory chip;
        a number of comparison modules configured to compare the records as the records pass along the input lines, wherein every input line is connected to every other input line by a separate comparison module, and wherein the comparison modules swap records between input lines as needed to place the records in a predefined order;
    wherein the computational device is a computational memory.

9. The computational device of claim 8, wherein the memory chip further comprises:
    a memory bank with a selected row buffer connected to the ALU;
    an accumulator connected to the ALU; and
    an indirect network in the ALU, the indirect network configured to sort up to K records in the accumulator and selected row buffer, compressing records with the same key, thereby creating unique records, and then write the unique records back into the memory bank, whereby K or fewer records are ultimately stored in the memory bank.

10. The computational device of claim 9, wherein the ALU is further configured to sort records using a bitonic merge operation.

11. The computational device of claim 9, wherein the memory chip further comprises:
a controller, wherein the controller is configured to, prior to writing back merged records, determine which records are written back into the memory bank and which records will remain in the accumulator.

12. The computational device of claim 9, wherein one network input of the indirect network connects to each record in the ALU.

13. The computational device of claim 12, wherein outputs of the indirect network wrap around to inputs of the memory bank.

14. The computational device of claim 8, wherein the computational memory is configured to receive and process an algorithm offloaded from a different processor unit.

15. A method of sorting and merging data in a computational device, the method comprising:
reading a selected row of data from a memory bank in the computational device into a selected row buffer of the memory bank, thereby creating up to K records in sorted order;
merging, by an arithmetic and logic unit (ALU), the records in the selected row buffer with up to K records stored in an accumulator connected to the memory bank, yielding up to 2K sorted records in the selected row buffer and accumulator, wherein the ALU is connected to the accumulator and selected row buffer of the memory bank, the ALU having an indirect network of 2K ports for reading and writing records in the memory bank and the accumulator, and the ALU further physically configured to operate as a sorting network, wherein the ALU comprises:
a first number of input lines connected to the selected row buffer;
a second number, equal to the first number, of input lines connected to the accumulator;
a number of comparison modules configured to compare records in the memory bank and accumulator as the records pass along the input lines, wherein every input line is connected to every other input line by a separate comparison module, and wherein the comparison modules swap records between input lines as needed to place the records in a predefined order;
determining, by a controller connected to the memory bank, ALU, and accumulator, which records of the up to 2K sorted records will be stored back into the memory bank and which will be left in the accumulator, whereby selected merged records are formed;
writing the selected merged records back into the memory bank;
selecting a new row comprising one of descendant subtrees of the selected row; and
repeating the above steps until all new rows are processed;
wherein the computational device is a computational memory.

16. The method of claim 15, wherein records with the same key are compressed such that fewer than K records are in the memory bank after writing.

17. The method of claim 15, further comprising:
receiving an algorithm from a different processing unit; and
processing the algorithm by the steps of reading a row of data, merging the records with up to K records stored in the accumulator, determining which records of the up to 2K sorted records will be stored back into the memory bank and which will be left in the accumulator, and writing the selected merged records back into the memory bank.

18. The method of claim 17, wherein the algorithm comprises one of sparse matrix multiplication and a graph algorithm.

19. The method of claim 17, wherein merging further comprises:
adding, for records with a same value field that specifies elements of a mathematical semiring, values of records with a same key using a semiring addition function, whereby values of unique records are created, and wherein the mathematical semiring is settable during operation.

20. The method of claim 19, wherein the mathematical semi-ring is set to one of integer addition and floating point addition.

* * * * *